US012782376B2

(12) United States Patent
Cheung et al.

(10) Patent No.: US 12,782,376 B2
(45) Date of Patent: Nov. 3, 2026

(54) FACILITATING CONTROLLED PARTICLE DEPOSITION FROM A DROPLET DISPENSER

(71) Applicant: THE UNIVERSITY OF BRITISH COLUMBIA, Vancouver (CA)

(72) Inventors: Karen Chihmin Cheung, Vancouver (CA); Eric Kin-Kwok Cheng, Vancouver (CA)

(73) Assignee: THE UNIVERSITY OF BRITISH COLUMBIA, Vancouver (CA)

(*) Notice: Subject to any disclaimer, the term of this patent is extended or adjusted under 35 U.S.C. 154(b) by 1262 days.

(21) Appl. No.: 17/649,959

(22) Filed: Feb. 4, 2022

(65) Prior Publication Data

US 2022/0155331 A1 May 19, 2022

Related U.S. Application Data

(63) Continuation of application No. PCT/CA2020/051076, filed on Aug. 6, 2020.

(Continued)

(51) Int. Cl.

| | |
|---|---|
| ***G01N 15/14*** | (2024.01) |
| ***G01N 15/1433*** | (2024.01) |
| ***G01N 35/10*** | (2006.01) |

(52) U.S. Cl.

CPC ..... *G01N 35/1016* (2013.01); *G01N 15/1433* (2024.01); *G01N 2035/1041* (2013.01)

(58) Field of Classification Search

CPC ........... G01N 35/1016; G01N 15/1433; G01N 2035/1041

See application file for complete search history.

(56) References Cited

U.S. PATENT DOCUMENTS

| | | | |
|---|---|---|---|
| 8,273,307 | B2 | 9/2012 | Eickhoff et al. |
| 8,614,100 | B2 | 12/2013 | Nordhoff et al. |

(Continued)

FOREIGN PATENT DOCUMENTS

| | | |
|---|---|---|
| CA | 2976402 | 8/2016 |
| DE | 102015202574 A1 | 8/2016 |

(Continued)

OTHER PUBLICATIONS

Investigation of the hydrodynamic response of cells in drop on demand piezoelectric inkjet nozzles. Eric Cheng, Haoran Yu, Ali Ahamadi, Karen Cheung Biofabrication 8 (2016) 015008 (Year: 216).*

(Continued)

*Primary Examiner* — Lyle Alexander
*Assistant Examiner* — Dwan A Gerido
(74) *Attorney, Agent, or Firm* — Kolitch Romano Dascenzo Gates LLP

(57) ABSTRACT

A method of facilitating controlled particle deposition from a droplet dispenser involves receiving at least one pre-dispensed image of a dispensing portion of the droplet dispenser, the dispensing portion including fluid to be dispensed in a subject droplet to a subject target region, receiving at least one post-dispensed image of the dispensing portion of the droplet dispenser after the subject droplet has been dispensed, comparing the at least one pre-dispensed image and the at least one post-dispensed image to determine a subject droplet particle count representing a count of particles included in the subject droplet, and producing signals for associating a representation of the subject droplet particle count with the subject target region. Other methods, apparatuses, systems, and non-transitory computer readable media are disclosed.

13 Claims, 29 Drawing Sheets

Related U.S. Application Data

(60) Provisional application No. 62/884,007, filed on Aug. 7, 2019.

(56) References Cited

U.S. PATENT DOCUMENTS

| | | | |
|---|---|---|---|
| 8,834,793 B2 | 9/2014 | Koltay et al. | |
| 9,267,918 B2 | 2/2016 | Joaquim et al. | |
| 9,600,710 B2 | 3/2017 | Figg et al. | |
| 2004/0086159 A1 | 5/2004 | Lary et al. | |
| 2012/0224166 A1 | 9/2012 | Heine et al. | |
| 2013/0037623 A1 | 2/2013 | Yamaguchi | |
| 2013/0095469 A1 | 4/2013 | Koltay et al. | |
| 2016/0252446 A1 | 9/2016 | Smith et al. | |
| 2016/0377525 A1 | 12/2016 | Foster et al. | |
| 2017/0072417 A1 | 3/2017 | Eickhoff et al. | |
| 2017/0274689 A1 | 9/2017 | Rodriguez et al. | |
| 2017/0343465 A1 | 11/2017 | Schoendube et al. | |
| 2019/0369486 A1 | 12/2019 | Traub et al. | |
| 2021/0048435 A1* | 2/2021 | Belushkin | A61B 5/0075 |
| 2021/0189381 A1 | 6/2021 | Craighead et al. | |
| 2021/0198659 A1 | 7/2021 | Salathia | |
| 2021/0198754 A1 | 7/2021 | Fan et al. | |
| 2021/0277471 A1 | 9/2021 | Zheng et al. | |
| 2021/0292835 A1 | 9/2021 | Johnson et al. | |
| 2023/0173519 A1* | 6/2023 | Bennet | G01N 15/1434 222/52 |

FOREIGN PATENT DOCUMENTS

| | | |
|---|---|---|
| DE | 102015011970 B4 | 3/2017 |
| DE | 202017003180 U1 | 8/2017 |
| EP | 1038184 A1 | 9/2000 |
| EP | 3222353 A1 | 9/2017 |
| JP | 2021119784 A | 8/2021 |
| WO | 2016193758 A1 | 12/2016 |
| WO | 2017031310 A1 | 2/2017 |
| WO | 201852137 A1 | 3/2018 |
| WO | 2020011773 A1 | 1/2020 |

OTHER PUBLICATIONS

Riba, J., et al. "Label-free isolation and deposition of single bacterial cells from heterogeneous samples for clonal culturing. Supplemental Material", Nature.com, Scientific Reports, Sep. 6, 2016, XP093062329, pp. 1-3.

International Patent Application No. PCT/CA2020/051076, International Search Report dated Nov. 13, 2020, 3 pages.

International Patent Application No. PCT/CA2020/051076, Written Opinion dated Nov. 13, 2020, 3 pages.

Enright et al., "Inkjet System Design Optimization For Reliable Cell Printing," 21st Int. Conference on Miniaturized Systems for Chemistry and Life Sciences, Oct. 22-26, 2017, Savannah Georgia USA, pp. 1149-1150.

Wang et al., "Label-free single-cell isolation enabled by microfluidic impact printing and real-time cellular recognition", Lab Chip 2021, the Royal Society of Chemistry Journal, Aug. 9, 2021, pp. 3695-3706.

Riba et al., "Label-free isolation and deposition of single bacterial cells from heterogeneous samples for clonal culturing",www.nature.com/scientificreports,Sep. 6, 2016, pp. 1-9.

Cole et al., "Printed droplet microfluidics for on demand dispensing of picoliter droplets and cells", PNAS, Aug. 15, 2017. vol. 114, No. 33, pp. 8728-8733.

European Patent Application No. 20850131.2, Extended European Search Report dated Jul. 21, 2023, 11 pages.

Tan, Run-xu, et al. "Cells Counting with Convolutional Neural Network," Intelligent Computing Methodologies: 14th International Conference, Springer International Publishing AG, First Published Online Jul. 6, 2018, pp. 102-111.

Riba, J., et al. "Label-free isolation and deposition of single bacterial cells from heterogeneous samples for clonal culturing," Nature.com, Scientific Reports, vol. 6, No. 1, Article No. 32837 (2016), Published Sep. 6, 2016, 9 pages.

* cited by examiner

1060

Target count record

| | | |
|---|---|---|
| 1062 | Target 1 total count | 1 |
| 1064 | Target 2 total count | 0 |
| 1066 | Target 3 total count | 0 |
| 1068 | Target 4 total count | 0 |
| | ... | |
| 1070 | Target 5184 total count | 0 |

FIG. 12

1100

Target count confidence record

| | | |
|---|---|---|
| 1102 | Target 1 confidence | 0.95 |
| 1104 | Target 2 confidence | 0 |
| 1106 | Target 3 confidence | 0 |
| | ... | |
| 1108 | Target 5184 confidence | 0 |

FIG. 13

1180

Target count validity record

| | |
|---|---|
| Target 1 validity | VALID |
| Target 2 validity | VALID |
| Target 3 validity | VALID |
| Target 4 validity | INVALID |
| ... | |
| Target 5184 validity | VALID |

FIG. 15

1680

Particle positions record

| | | |
|---|---|---|
| 1682 | First particle x | 101 |
| 1684 | First particle y | 361 |
| 1687 | Second particle x | 87 |
| 1688 | Second particle y | 232 |
| 1690 | Third particle x | 130 |
| 1692 | Third particle y | 133 |

FIG. 24

1740

Particle positions record

| | | |
|---|---|---|
| 1742 | First particle x | 84 |
| 1744 | First particle y | 286 |
| 1746 | Second particle x | 127 |
| 1748 | Second particle y | 169 |

FIG. 26

FACILITATING CONTROLLED PARTICLE DEPOSITION FROM A DROPLET DISPENSER

RELATED APPLICATIONS

This application is a continuation of International Patent Application No. PCT/CA2020/051076, filed Aug. 6, 2020, which claims the benefit of U.S. Provisional Application No. 62/884,007 entitled "FACILITATING CONTROLLED PARTICLE DEPOSITION FROM A DROPLET DISPENSER", filed on Aug. 7, 2019, which is hereby incorporated by reference herein in its entirety.

BACKGROUND

1. Field

Embodiments of this invention relate to controlled particle deposition and more particularly to facilitating controlled particle deposition from a droplet dispenser.

2. Description of Related Art

Controlled particle deposition may be used to isolate particles or cells for various applications including for next generation sequencing workflows. Some known particle deposition systems may use microfluidic chips that can manipulate cell-sized particles, nano-liter sized jetted droplets wherein the droplets encapsulate the particles or cells, microfluidic droplet generators and/or fluorescence-activated cell sorters (FACS), for example. Some systems rely on random partitioning of the particles or cells into nanowells or droplets, following the Poisson distribution. This may result in a low fill factor with a large number of empty wells or droplets with a persistent component of multiple-cell events. Some known systems may lack the ability to validate single-cell events, especially within small timescales, which may be required for some applications, such as, for example, RNA sequencing applications.

SUMMARY

In accordance with various embodiments, there is provided a method of facilitating controlled particle deposition from a droplet dispenser, the method involving receiving at least one pre-dispensed image of a dispensing portion of the droplet dispenser, the dispensing portion including fluid to be dispensed in a subject droplet to a subject target region, receiving at least one post-dispensed image of the dispensing portion of the droplet dispenser after the subject droplet has been dispensed, comparing the at least one pre-dispensed image and the at least one post-dispensed image to determine a subject droplet particle count representing a count of particles included in the subject droplet, and producing signals for associating a representation of the subject droplet particle count with the subject target region.

Comparing the at least one pre-dispensed image and the at least one post-dispensed image may involve causing a representation of the at least one pre-dispensed image and the at least one post-dispensed image to be input into one or more functions.

Causing the representation of the at least one pre-dispensed image and the at least one post-dispensed image to be input into the one or more functions may involve causing the one or more functions to generate a plurality of count confidences, each associated with a respective prospective particle count.

Comparing the at least one pre-dispensed image and the at least one post-dispensed image to determine the subject droplet particle count may involve determining the subject droplet particle count to be the particle count associated with the largest of the plurality of count confidences.

The method may involve comparing the largest of the plurality of count confidences to a threshold confidence to determine whether the largest of the plurality of confidences is less than the threshold confidence.

Comparing the at least one pre-dispensed image and the at least one post-dispensed image may involve generating a first image difference representing a difference between the first pre-dispensed image and the at least one post-dispensed image, and causing a representation of the first image difference to be input into the one or more functions.

The first pre-dispensed image may represent the droplet dispenser at a first pre-dispensed time and the at least one pre-dispensed image may include a second pre-dispensed image representing the droplet dispenser at a second pre-dispensed time prior to the first pre-dispensed time. Comparing the at least one pre-dispensed image and the at least one post-dispensed image may involve generating a second image difference representing a difference between the second pre-dispensed image and the first pre-dispensed image, and causing a representation of the second image difference to be input into the one or more functions.

The method may involve causing a first preceding droplet to be dispensed by the droplet dispenser between the second pre-dispensed time and the first pre-dispensed time.

The at least one pre-dispensed image may include a third pre-dispensed image representing the droplet dispenser at a third pre-dispensed time prior to the second pre-dispensed time, and comparing the at least one pre-dispensed image and the at least one post-dispensed image may involve generating a third image difference representing a difference between the third pre-dispensed image and the second pre-dispensed image, and causing a representation of the third image difference to be input into the one or more functions.

The method may involve causing a second preceding droplet to be dispensed by the droplet dispenser between the third pre-dispensed time and the second pre-dispensed time.

The one or more functions may include one or more neural network functions.

The method may involve training the one or more neural network functions.

Producing signals for associating the representation of the subject droplet particle count with the subject target region may involve determining whether the subject droplet particle count matches a desired particle count and, if the subject droplet particle count matches the desired particle count, producing signals for identifying the subject target region as containing the desired particle count.

The method may involve determining whether the subject droplet particle count is less than a desired particle count and, if the subject droplet particle count is not less than the desired particle count, producing signals for causing the droplet dispenser to be configured to dispense a subsequent droplet to a subsequent target region different from the subject target region.

The method may involve determining whether the subject droplet particle count is less than a desired particle count and, if the subject droplet particle count is less than the desired particle count, producing signals for causing the droplet dispenser to dispense a further droplet to the subject target region.

The method may involve identifying one or more pre-dispensed image particles depicted in the at least one pre-dispensed image, and identifying one or more post-dispensed image particles depicted in the at least one post-dispensed image. Comparing the at least one pre-dispensed image and the at least one post-dispensed image may involve identifying at least one unmatched pre-dispensed image particle of the one or more pre-dispensed image particles as not matching any of the post-dispensed image particles and therefore representing a particle included in the subject droplet, and determining the subject droplet particle count as a count of the at least one unmatched pre-dispensed image particle.

In accordance with various embodiments, there is provided a method of training at least one neural network function for facilitating controlled particle deposition, the method involving receiving a plurality of sets of training images, each of the sets of training images including at least one pre-dispensed image of a dispensing portion of a droplet dispenser, the dispensing portion including fluid to be dispensed in a droplet to a target region, and at least one post-dispensed image of the dispensing portion of the droplet dispenser after the droplet has been dispensed. The method involves receiving a plurality of droplet particle counts, each of the droplet particle counts associated with one of the sets of training images and representing a count of particles dispensed in the droplet that is the subject of the associated set of training images, and causing the at least one neural network function to be trained using representations of the sets of training images as respective inputs and the associated droplet counts as desired outputs.

For each of the sets of training images, the at least one pre-dispensed image included in the set of training images may include a first pre-dispensed image, and causing the at least one neural network function to be trained may involve generating a first image difference representing a difference between the first pre-dispensed image and the at least one post-dispensed image, and causing a representation of the first image difference to be input into the at least one neural network function.

For each of the sets of training images, the first pre-dispensed image included in the set of training images may represent the droplet dispenser at a first pre-dispensed time. The at least one pre-dispensed image included in the set of training images may include a second pre-dispensed image representing the droplet dispenser at a second pre-dispensed time prior to the first pre-dispensed time. Causing the at least one neural network function to be trained may involve generating a second image difference representing a difference between the second pre-dispensed image and the first pre-dispensed image, and causing a representation of the second image difference to be input into the at least one neural network function.

The second pre-dispensed image may represent the droplet dispenser at the second pre-dispensed time prior to the first pre-dispensed time, a first preceding droplet having been dispensed by the droplet dispenser between the second pre-dispensed time and the first pre-dispensed time.

For each of the sets of training images, the at least one pre-dispensed image included in the set of training images may include a third pre-dispensed image representing the droplet dispenser at a third pre-dispensed time prior to the second pre-dispensed time. Causing the at least one neural network function to be trained may involve generating a third image difference representing a difference between the third pre-dispensed image and the second pre-dispensed image, and causing a representation of the third image difference to be input into at least one neural network function.

The third pre-dispensed image may represent the droplet dispenser at the third pre-dispensed time prior to the second pre-dispensed time, a second preceding droplet having been dispensed by the droplet dispenser between the third pre-dispensed time and the second pre-dispensed time.

In accordance with various embodiments, there is provided a system for facilitating controlled particle deposition from a droplet dispenser, the system comprising at least one processor configured to perform any of the above methods.

In accordance with various embodiments, there is provided a non-transitory computer readable medium having stored thereon codes that, when executed by at least one processor, cause the at least one processor to perform any of the above methods.

In accordance with various embodiments, there is provided a system for facilitating controlled particle deposition from a droplet dispenser, the system including means for receiving at least one pre-dispensed image of a dispensing portion of the droplet dispenser, the dispensing portion including fluid to be dispensed in a subject droplet to a subject target region, means for receiving at least one post-dispensed image of the dispensing portion of the droplet dispenser after the subject droplet has been dispensed, means for comparing the at least one pre-dispensed image and the at least one post-dispensed image to determine a subject droplet particle count representing a count of particles included in the subject droplet, and means for producing signals for associating a representation of the subject droplet particle count with the subject target region.

In accordance with various embodiments, there is provided a system for training at least one neural network function for facilitating controlled particle deposition, the system including means for receiving a plurality of sets of training images, each of the sets of training images including at least one pre-dispensed image of a dispensing portion of a droplet dispenser, the dispensing portion including fluid to be dispensed in a subject droplet to a subject target region, and at least one post-dispensed image of the dispensing portion of the droplet dispenser after the subject droplet has been dispensed. The system includes means for receiving a plurality of subject droplet particle counts, each of the subject droplet particle counts associated with one of the sets of training images and representing a count of particles dispensed in the subject droplet for the set of training images, and means for causing the at least one neural network function to be trained using representations of the sets of training images as respective inputs and the associated subject droplet counts as desired outputs.

Other aspects and features of embodiments of the invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 12 is a representation of a target count record that may be used in the system shown in FIG. 1 in accordance with various embodiments;

FIG. 13 is a representation of a target count confidence record that may be used in the system shown in FIG. 1 in accordance with various embodiments;

FIG. 15 is a representation of a target count validity record that may be used in the system shown in FIG. 1 in accordance with various embodiments;

FIG. 24 is a representation of a particle positions record that may be used by the controller shown in FIG. 19 in accordance with various embodiments;

FIG. 26 is a representation of a particle positions record that may be used by the controller shown in FIG. 19 in accordance with various embodiments;

DETAILED DESCRIPTION

Controlled particle deposition may be desirable for various applications, such as, for example, to facilitate single-cell next generation sequencing workflows, such as biological cell genomic sequencing workflows. In some embodiments, by probing at the single-cell level, insights may be gained at much higher phenotypic resolution than was previously attainable at the bulk tissue analysis level. Some single-cell next generation sequencing workflows may be described in four major steps: 1) single-cell isolation, 2) content amplification, 3) sequencing and 4) data processing. While sequencing technology has matured at a rate outpacing Moore's Law due to a reduction in cost, an increase in read accuracy, and more parallelized throughput, some cell isolation, such as single-cell isolation, methodologies have lagged behind, limited by low throughput and a lack in data confidence—that is, whether the data was generated from a single cell or from multiple cells. In accordance with various embodiments, there is described herein a controlled particle deposition system that may be used for cell isolation, such as single-cell isolation.

Figure 1:
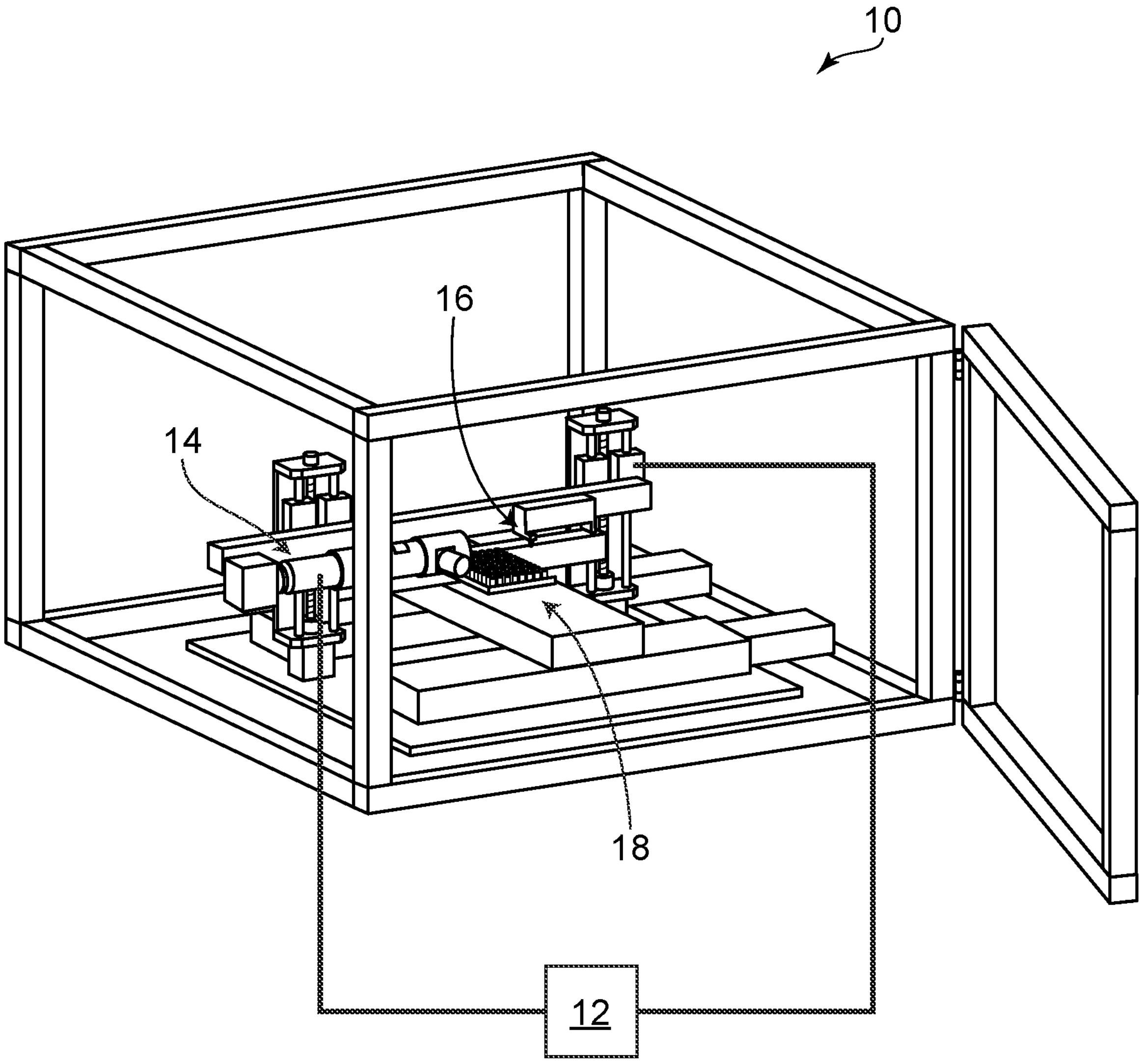
FIG. 1 is a schematic perspective view of a system for facilitating controlled particle deposition according to various embodiments.

Referring to FIG. 1, a system for facilitating controlled particle deposition in accordance with various embodiments is shown at 10. In accordance with various embodiments, the system 10 may facilitate a high-throughput particle dispenser, such as a single-cell dispenser, for example, that may be used in various applications, including, for example, next generation sequencing systems.

Referring to FIG. 1, the system 10 includes a controller 12 in communication with an imager 14 and a substrate stage 18. The system 10 also includes a droplet dispenser 16. In some embodiments, the droplet dispenser 16 may be controllable via signals produced by the imager 14 and so the droplet dispenser 16 may be indirectly controllable by the controller 12 via the imager 14.

In various embodiments, the controller 12 may be configured to control particle deposition by the droplet dispenser 16 onto the substrate stage 18. For example, in some embodiments, the droplet dispenser 16 may be in communication with a fluid source having a source fluid or suspension including a plurality of particles or cells and the controller 12 may be configured to cause the droplet dispenser 16 to dispense, from the source fluid, fluid including a desired number of particles or cells (such as, for example, a single particle or cell) into target regions of the substrate stage 18. In various embodiments, the controller 12 may be configured to use information received from the imager 14 and/or control of the droplet dispenser 16 and/or the substrate stage 18 to facilitate this control.

Figure 2:
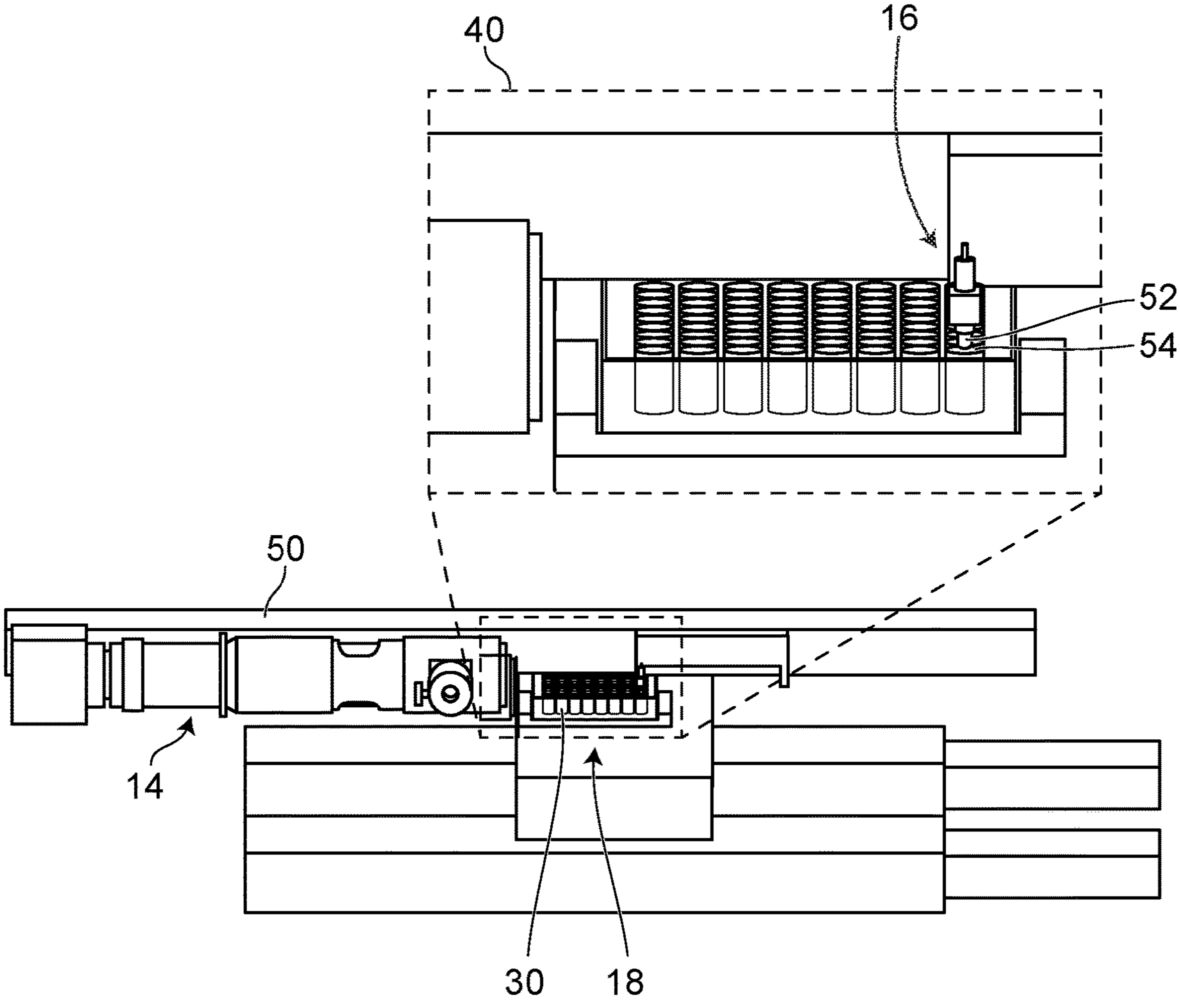
FIG. 2 is a front perspective view of a portion of the system shown in FIG. 1 according to various embodiments.

Referring to FIG. 2, the imager 14, the droplet dispenser 16 and the substrate stage 18 are shown from a front perspective view with a zoomed in partial view 40 included.

In various embodiments, the imager 14 may include a camera and lens system fixed to the droplet dispenser 16. In some embodiments, the imager 14 may include, for example, a FLIR BlackflyS BFS-U3-32S4 camera configured to capture images with exposure time of about 3-5 ms and a Thor Labs MVL12X3Z zoom lens with attachments. In some embodiments, referring to FIG. 2, the imager 14 may be fixed to the droplet dispenser via mount 50. In various embodiments, by fixing the imager 14 in place relative to the droplet dispenser 16, continuous imaging feedback of the nozzle may be used and/or images may be acquired and saved at small time scales which may validate the deposition of a desired number of particles, such as a single cell or particle with high confidence.

In various embodiments, the droplet dispenser 16 may include a controllable inkjet dispenser having a dispensing portion 52, which may for example include an inkjet nozzle, in communication with the fluid source. In various embodiments, an inkjet dispenser may be configured to dispense low volumes of fluid (e.g., in the picoliter range). In some embodiments, for example, the droplet dispenser 16 may include a Microfab ABP-01, which may be configured to dispense 300-600 picoliters at a time. In various embodiments dispensing low volumes of fluid compared to other dispensers may provide various advantages, such as, for example, a decrease in the probability of capturing ambient DNA/RNA within a cell suspension, which may be desirable for single-cell isolation in genomics applications, for example.

In some embodiments, the system 10 may be used to dispense fluid having a high viscosity, a neutrally buoyant solution, and/or the droplet dispenser 16 may include an inkjet nozzle with tuned physical parameters configured to allow for optimized particle deposition. For example, in some embodiments, the inkjet nozzle may have geometries or taper angles that help to ensure that particles are moving forward or downstream towards a nozzle orifice when dispensing takes place. For example, in some embodiments, the taper angles may be less than about 15° (See, for example, B. Enright, E. Cheng, H. Yu, K. C. Cheung, and A. Ahmadi, "Inkjet System Design Optimization For Reliable Cell Printing," *21st Int. Conf. Miniaturized Syst. Chem. Life Sci.,* 2017). In some embodiments, for example, the solution may be 10% w/v Ficoll PM 400 in Phosphate Buffered Saline (PBS). In various embodiments, by carefully controlling the input cell concentration into the inkjet nozzle, the system 10 may be capable of dispensing cells at a rapid rate with a large population of single-cells. In various embodiments, under controlled conditions, a Poisson distribution may be achieved from dispensing cells within inkjet nozzles as described herein. For example, by controlling the cell concentration, in some embodiments, the system 10 may be able to achieve higher single cell component when compared to the multiple cell component; however, there may be a large component with no cells. Or if the cell concentration is increased, in some embodiments, the system 10 may be able to have a maximum single cell component of about 37% with an equal probability of zero cells. In various embodiments, either of these conditions may be appropriate for use under certain experiments; however, the random seeding of cells and persistent non-one cell component may not be ideal in many cases.

In some embodiments, the droplet dispenser 16 and the imager 14 may be held in a fixed position over the substrate stage 18, which may be controllable to move relative to the droplet dispenser 16 and the imager 14 to change/update a target region for the droplet dispenser 16 in the substrate stage 18. In some embodiments, the substrate stage 18 may include an x-y-z controllable stage having thereon a microplate or microtiter plate 30 including a plurality of target regions or wells. In some embodiments, the substrate stage 18 may be configured to control a yaw axis of rotation of the microplate 30. In various embodiments, the microplate 30 may include a machined aluminum microwell chip including an array of 72 by 72 wells or targets, for example.

Referring still to FIG. 2, the imager 14 may be configured to capture images of the dispensing portion 52 of the droplet dispenser 16 and to transmit signals representing the images of the dispensing portion 52 to the controller 12. In various embodiments, the controller 12 may be configured to receive at least one pre-dispensed image of the dispensing portion 52 of the droplet dispenser 16, the dispensing portion including fluid to be dispensed in a droplet to a first target region 54 of the substrate stage 18. The droplet dispenser 16 may then dispense the droplet into the first target region 54. For example, in some embodiments, after receiving the pre-dispensed image, the controller 12 may produce signals for causing the imager 14 to cause the droplet dispenser 16 to dispense the droplet into the first target region 54.

In some embodiments, the received signals by the imager 14 from the controller 12 may also trigger the imager 14 capturing and sending at least one post-dispensed image of the dispensing portion 52 of the droplet dispenser 16 to the controller 12, the post-dispensed image depicting the dispensing portion 52 after the droplet has been dispensed.

In various embodiments, the controller 12 may be configured to receive the at least one post-dispensed image of the dispensing portion 52 of the droplet dispenser 16 after the droplet has been dispensed from the imager 14.

In various embodiments, the controller 12 may then compare the at least one pre-dispensed image and the at least one post-dispensed image to determine a droplet particle count representing a count of particles included in the dispensed droplet. For example, in some embodiments, the controller 12 may be configured to cause a representation of the at least one pre-dispensed image and the at least one post-dispensed image to be input into one or more functions, such as a neural network function. In some embodiments, the controller 12 may be configured to generate a plurality of count confidences, each associated with a respective prospective particle count or class and to determine the droplet particle count to be the particle count associated with the largest of the plurality of count confidences.

In various embodiments, the controller 12 may then produce signals for associating a representation of the droplet particle count with the target region. In some embodiments, the controller 12 may produce signals for including the droplet particle count in a target count record in association with the target region. In some embodiments, the controller 12 may generate and store a target count record associating each target region in the substrate stage 18 with a number representing a particle count for the target region.

In various embodiments, the generated target count record may be used to identify which of the target regions included in the microplate 30 of the substrate stage 18 hold a desired particle count and therefore may be useable for next generation genomic sequencing systems. For example, in some embodiments, the system 10 shown in FIG. 1 may include a display in communication with the controller 12 and the controller 12 may be configured to cause a representation of the target count record to be displayed by the display to a user. In some embodiments, the user may view the display and use the information as required for their application. In some embodiments, the controller 12 may be configured to save the target count record as a file that may be used later on and/or sent to another device/system for use.

In some embodiments, the system 10 described herein may be configured to skew particle or cell encapsulation towards a single dispensed cell per target by skewing away from the Poisson distribution, in terms of having a more controlled partitioning of cells into targets or nanowells. In some embodiments, simulated results have shown the system 10 to be capable of achieving high single-cell rates (>80%) using low cell concentrations which may be advantageous as it may reduce the risk of clogging within the inkjet nozzle.

In some embodiments, because the pre-dispensed and post-dispensed images are being compared to determine a dispensed particle count, no a priori information of the inkjet nozzle's encapsulation properties may be required for the system 10 and so there may be no requirements to identify regions within the inkjet nozzle, which may add to the reliability of the system 10 as no estimations may be necessary. In some embodiments, the encapsulation properties may determine whether or not a particle will be encapsulated into the dispensed droplet, given the present working conditions. In some embodiments, with the system 10 the encapsulation properties may not need to be determined for each nozzle geometry, actuation waveform, cell type, suspending media composition, as may be required by other systems.

In some embodiments, by validating single-cell events while the cells are within the nozzle, the time which a cell may be exposed to unfavorable environments (such as high shear or low $CO_2$ environments) may be reduced before the cell is lysed which may lead to reliability in various applications, such as, for example RNA applications where gene expression profiles may be time sensitive and can change in response to stress on the cells.

Controller—Processor Circuit

Figure 3:
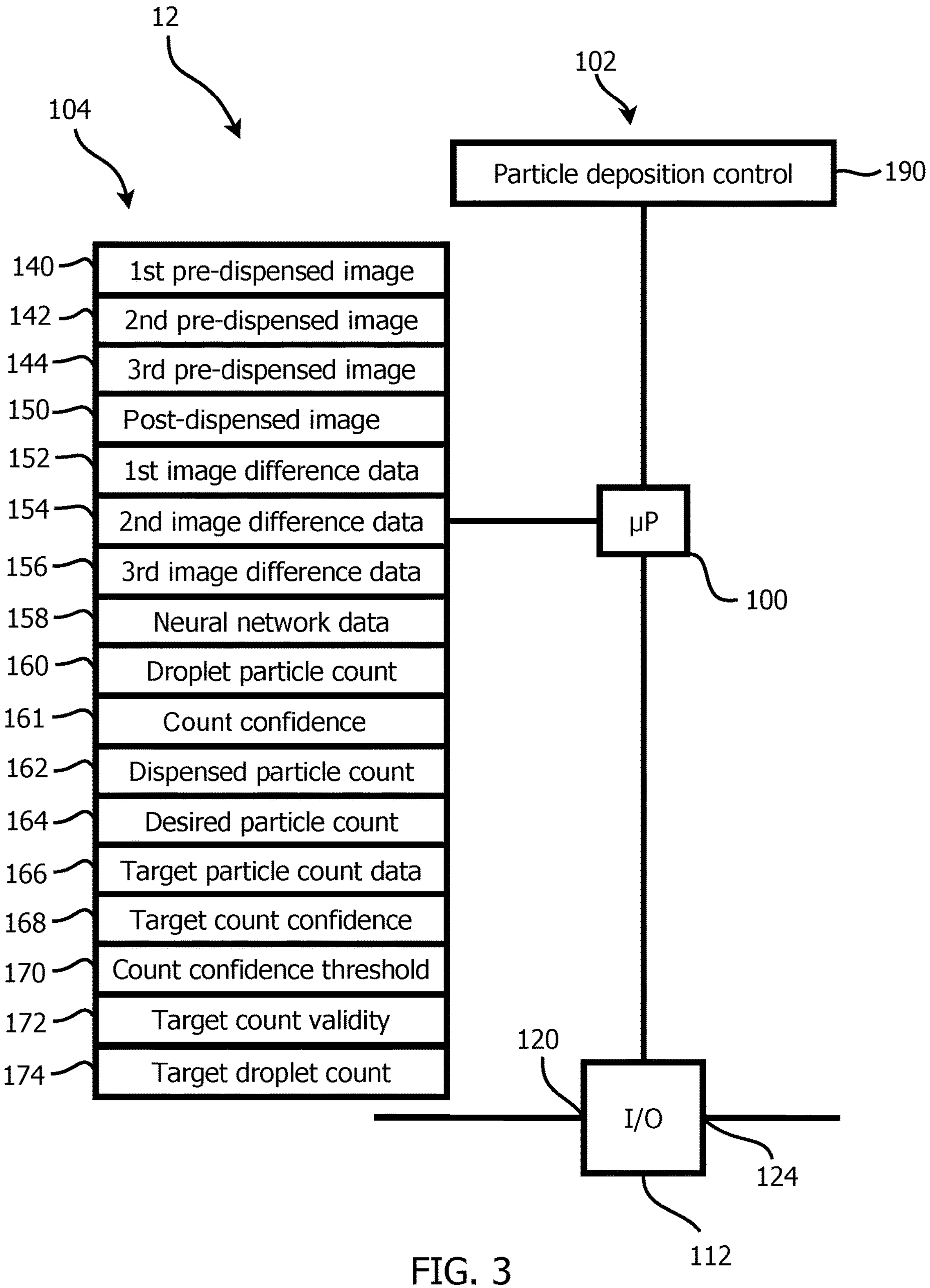
FIG. 3 is a schematic view of a controller of the system shown in FIG. 1 including a processor circuit according to various embodiments.

Referring now to FIG. 3, a schematic view of the controller 12 of the system 10 shown in FIG. 1 according to various embodiments is shown. Referring to FIG. 3, the controller 12 includes a processor circuit including a controller processor 100 and a program memory 102, a storage memory 104, and an input/output (I/O) interface 112, all of which are in communication with the controller processor 100. In various embodiments, the controller processor 100 may include one or more processing units, such as for example, a central processing unit (CPU), a graphical processing unit (GPU), and/or a field programmable gate array (FPGA). In some embodiments, any or all of the functionality of the controller 12 described herein may be implemented using one or more FPGAs.

The I/O interface 112 includes an interface 120 for communicating with the imager 14 and an interface 124 for communicating with the substrate stage 18. In some embodiments, the I/O interface 112 may also include an additional interface for facilitating networked communication through a network such as the Internet. In some embodiments, any or all of the interfaces may facilitate a wireless or wired communication. In some embodiments, for example, interfaces 120 and 124 may be implemented using a USB connection. In some embodiments, each of the interfaces shown in FIG. 3 may include one or more interfaces and/or some or all of the interfaces included in the I/O interface 112 may be implemented as combined interfaces or a single interface.

In some embodiments, where a device is described herein as receiving or sending information, it may be understood that the device receives signals representing the information via an interface of the device or produces signals representing the information and transmits the signals to the other device via an interface of the device.

Processor-executable program codes for directing the controller processor 100 to carry out various functions are stored in the program memory 102. Referring to FIG. 3, the program memory 102 includes a block of codes 190 for directing the controller 12 to perform particle deposition control functions. In this specification, it may be stated that certain encoded entities such as applications or modules perform certain functions. Herein, when an application, module or encoded entity is described as taking an action, as part of, for example, a function or a method, it will be understood that at least one processor (e.g., the controller processor 100) is directed to take the action by way of programmable codes or processor-executable codes or instructions defining or forming part of the application.

The storage memory 104 includes a plurality of storage locations including location 140 for storing first pre-dispensed image data, location 142 for storing second pre-dispensed image data, location 144 for storing third pre-dispensed image data, location 150 for storing post-dispensed image data, location 152 for storing first image difference data, location 154 for storing second image difference data, location 156 for storing third image difference data, location 158 for storing neural network data, location 160 for storing droplet particle count data, location 161 for storing count confidence data, location 162 for storing dispensed particle count data, location 164 for storing desired particle count data, location 166 for storing target particle count data, location 168 for storing target count confidence data, location 170 for storing count confidence threshold data, location 172 for storing target count validity data, and location 174 for storing target droplet count data. In various embodiments, the plurality of storage locations may be stored in a database in the storage memory 104.

In various embodiments, the block of codes 190 may be integrated into a single block of codes or portions of the block of code 190 may include one or more blocks of code stored in one or more separate locations in the program memory 102. In various embodiments, any or all of the locations 140-172 may be integrated and/or each may include one or more separate locations in the storage memory 104.

Each of the program memory 102 and storage memory 104 may be implemented as one or more storage devices including random access memory (RAM), a hard disk drive (HDD), a solid-state drive (SSD), a network drive, flash memory, a memory stick or card, any other form of non-transitory computer-readable memory or storage medium, and/or a combination thereof. In some embodiments, the program memory 102, the storage memory 104, and/or any portion thereof may be included in a device separate from the controller 12 and in communication with the controller 12 via the I/O interface 112, for example.

Controller Operation

As discussed above, in various embodiments, the controller 12 shown in FIGS. 1 and 3 may facilitate controlled particle deposition from the droplet dispenser 16 using the imager 14 and/or the substrate stage 18.

Figure 4:
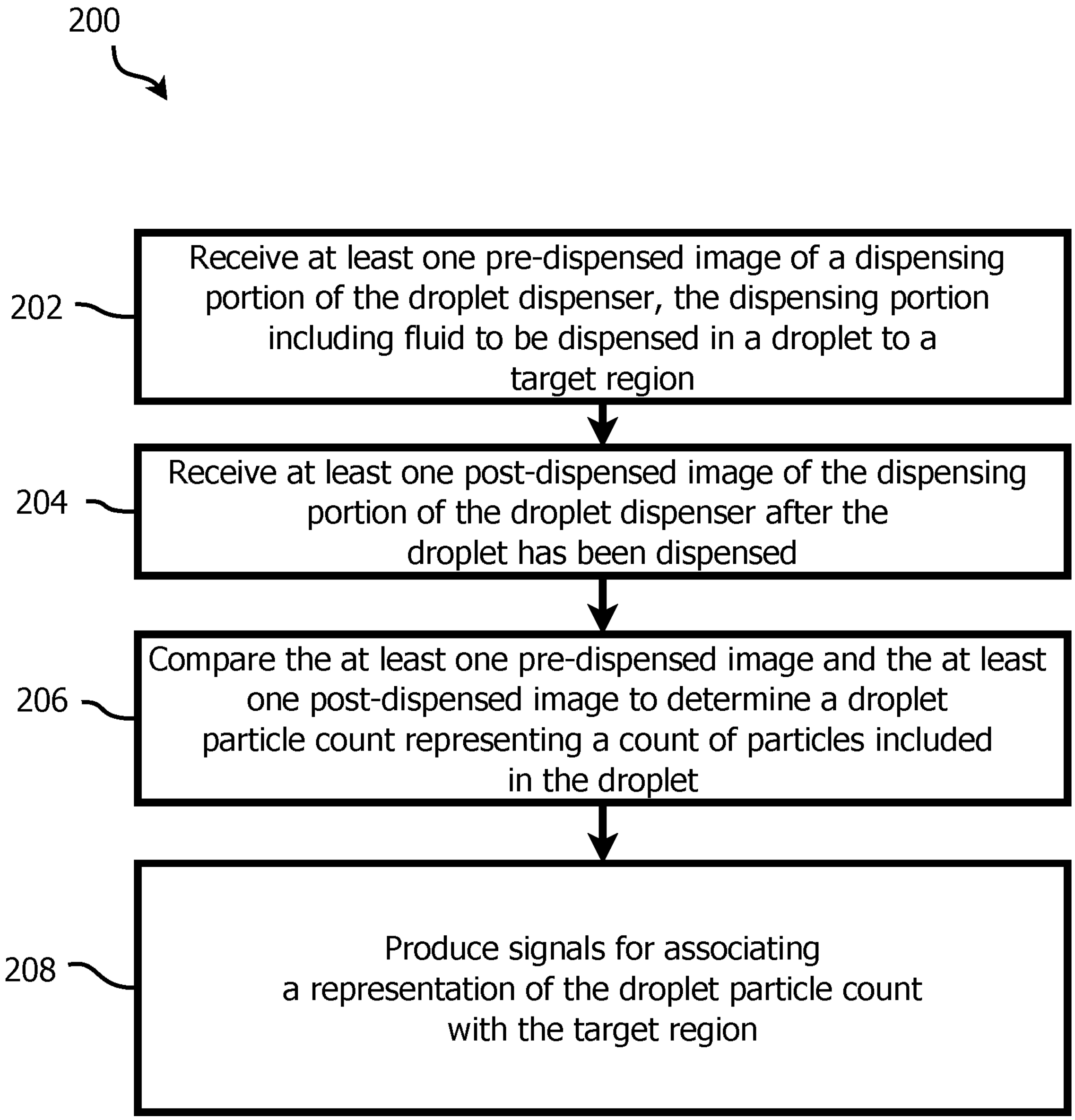
FIG. 4 is a flowchart depicting blocks of code for directing the controller shown in FIG. 3 to perform particle deposition control functions in accordance with various embodiments.

Referring now to FIG. 4, a flowchart depicting blocks of code for directing the controller processor 100 shown in FIG. 3 to perform particle deposition control functions in accordance with various embodiments is shown generally at 200. The blocks of code included in the flowchart 200 may be encoded in the block of codes 190 of the program memory 102 shown in FIG. 3, for example.

Referring to FIG. 4, the flowchart 200 begins with block 202 which directs the controller processor 100 shown in FIG. 3 to receive at least one pre-dispensed image of a dispensing portion of the droplet dispenser, the dispensing portion including fluid to be dispensed in a droplet to a target region. In various embodiments, block 202 may direct the controller processor 100 to communicate with the imager 14 via the interface 120 of the I/O interface 112 to cause the imager 14 to capture a first pre-dispensed image of the inkjet nozzle of the droplet dispenser 16, as shown at 240 in FIG. 5, for example, representing the droplet dispenser 16 at a first time with the droplet dispenser 16 configured to dispense a first droplet into the first target region 54 as shown in FIG. 2.

In some embodiments, the imager 14 may include a camera and a lens which is configured to focus on the contents or fluid in the dispensing portion 52 of the droplet dispenser 16 shown in FIG. 2. In some embodiments, to avoid interference between the lens and the substrate stage 18 while still allowing the imager 14 to capture focused images above all of the target regions of the microplate 30, the lens of the imager 14 may need to have a working distance that is larger than a threshold working distance.

In some embodiments, for example, if the substrate stage 18 is not configured to rotate the microplate to allow the imager 14 to image from both sides of the microplate 30, the threshold working distance may be a shortest side or the width of the microplate 30. In some embodiments, the largest microplate 30 that may be used in the system 10 may be about 127 mm by 85 mm and so the lens may need a minimum working distance of 85 mm in order to accommodate for this. In some embodiments, the imager 14 may include a high resolution monochrome camera and a long working lens to achieve a resolution of 0.22 μm with a 456×342 μm field-of-view and a working distance of 86 mm. In some embodiments, with a resolving power of 3.34 μm this setup may be appropriate for identifying cell-sized particles. In some embodiments, the imager 14 may include a color camera and/or a camera that is configured to sense fluorescence.

In some embodiments, by using a long working distance lens in the imager 14, the nozzle may be positioned right above the target region of the microplate 30 which may allow for accurate droplet placement by minimizing the effects of droplet deflection by minimizing the distance which the droplet travels through the air.

In some embodiments, for compatibility with smaller particles such as cell nuclei or certain bacterial cells, a higher resolving power lens may be used. In some embodiments, because long working distance and high resolving power lens may be difficult to source as the resolving power is inversely proportional to the numerical aperture, the substrate stage 18 may be configured to allow rotation of the microplate 30 such that the lens needs a working distance of only about half of the width of the microplate 30. In such embodiments, the controller 12 may be configured to communicate with the substrate stage 18 to cause the substrate stage to, once half of a microplate 30 is filled, 1) drop down clearing the lens, 2) rotate 180° and 3) raise back up to be printed onto the other side of the microplate. In some embodiments, such rotation may allow a 10× objective lens with a 51 mm working distance and a 1.31 μm resolving power be used in place of a zoom lens, thereby allowing for resolving smaller particles.

Figure 5:
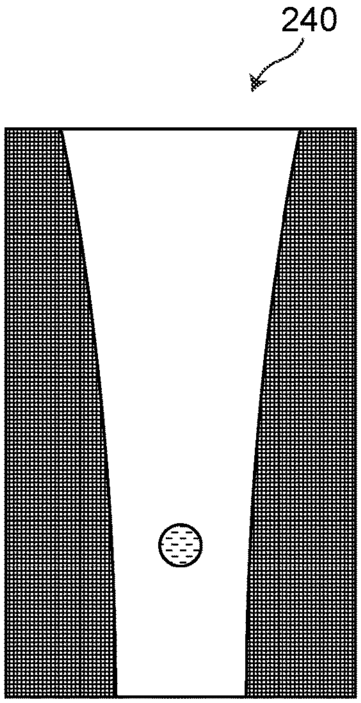
FIG. 5 is a representation of a first pre-dispensed image that may be used in the system shown in FIG. 1 in accordance with various embodiments.

Referring to FIG. 4, in various embodiments, block 202 may direct the controller processor 100 to receive the first pre-dispensed image 240 shown in FIG. 5 and to store the received first pre-dispensed image in the location 140 of the storage memory 104 shown in FIG. 3.

Figure 6:
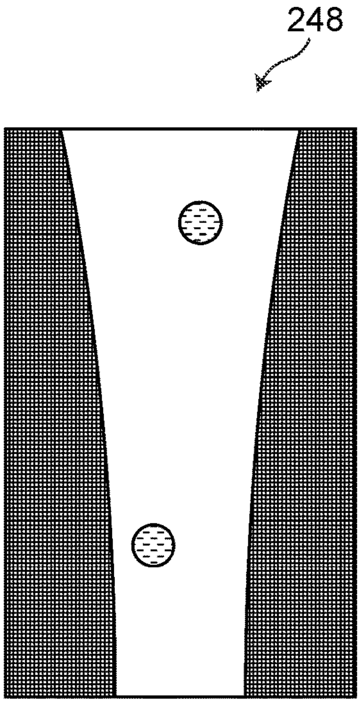
FIG. 6 is a representation of a second pre-dispensed image that may be used in the system shown in FIG. 1 in accordance with various embodiments.

In some embodiments, the controller 12 may be configured to receive more than one pre-dispensed image. In some embodiments, the at least one pre-dispensed image may include a second pre-dispensed image 248 as shown in FIG. 6 representing the droplet dispenser 16 at a second pre-dispensed time prior to the first pre-dispensed time. In some embodiments, the second pre-dispensed image may have been previously received by the controller 12, generally as described above for the first pre-dispensed image and stored in the location 142 of the storage memory 104. In some embodiments, the controller 12 may have caused a first preceding droplet to be dispensed by the droplet dispenser 16 between the second pre-dispensed time and the first pre-dispensed time.

Figure 7:
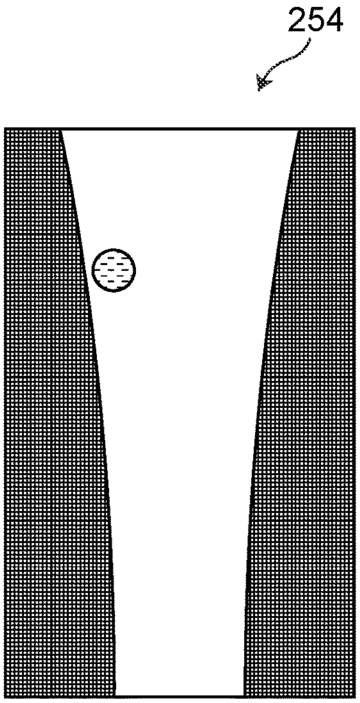
FIG. 7 is a representation of a third pre-dispensed image that may be used in the system shown in FIG. 1 in accordance with various embodiments.

In some embodiments, the at least one pre-dispensed image may include a third pre-dispensed image 254 as shown in FIG. 7 representing the droplet dispenser 16 at a third pre-dispensed time prior to the second pre-dispensed time. In some embodiments, the third pre-dispensed image may have been previously received by the controller generally as described above for the first pre-dispensed image and stored in the location 144 of the storage memory 104. In some embodiments, the controller 12 may have caused a second preceding droplet to be dispensed by the droplet dispenser 16 between the third pre-dispensed time and the second pre-dispensed time. In some embodiments, without the requirement for machine movement to a next target (e.g. when printing into the same target) average time between dispensing droplets may be about 14.58 ms. In some embodiments, including machine movement to a next target, average time between dispensing droplets may be about 178.22 ms.

In various embodiments, including more than one pre-dispensed image, such as the second and/or third pre-dispensed images 248 and 254 shown in FIGS. 6 and 7 in the at least one pre-dispensed images may facilitate improved accuracy in determining particle counts for dispensed droplets using the pre-dispensed images. For example, in some embodiments, using more than one pre-dispensed image may allow for the visualization of the particles or cells as they move across the field of view of the imager 14 within a nozzle or dispenser, giving more information that may be later used by a neural network, for example.

In some embodiments, on average a particle or cell may enter and exit the field of view of the imager 14 within 3 droplets. Accordingly, in some embodiments using 3 pre-dispensed images may facilitate all images of a particle or cell that is dispensed being captured in the 3 pre-dispensed images.

In some embodiments, because a classification is being made using 2D images of a 3D volume, multiple particles or cells may temporarily overlap within the 2D images, appearing very similar to only 1 particle or cell, for example. In various embodiments, by incorporating more than one pre-dispensed image, functions such as a neural network may be trained to identify, using the pre-dispensed images, cases such as where two particles or cells that appear upstream in the nozzle appear to be overlapping in the next pre-dispensed image before being dispensed as an event where 2 particles or cells were dispensed. In various embodiments, if one were only to use a single pre-dispensed image there may be few or no indicators that suggest the pre-dispensed image contained two overlapping particles or cells.

In some embodiments, having a droplet dispensed between capturing the pre-dispensed images may facilitate improved accuracy in determining the particle counts using the pre-dispensed images. For example, in some embodiments, interleaving dispensing of droplets with capturing the pre-dispensed images may facilitate providing further information regarding the particles or cells shown in the pre-dispensed images.

In some embodiments, the controller 12 may be configured to, before dispensing to the first target region, have the third pre-dispensed image captured, dispense a droplet to a discard region, have the second pre-dispensed image captured, and then dispense another droplet to a discard area, before having the first pre-dispensed image captured and targeting the first target region, such that the first, second, and third pre-dispensed images may be provided before the first droplet is dispensed to the first target region. As described in further detail below, after a droplet is dispensed, the controller 12 may be configured to treat the former first pre-dispensed image as a second pre-dispensed image and to treat the former second pre-dispensed image as a third pre-dispensed image for the next droplet to be dispensed.

Figure 8:
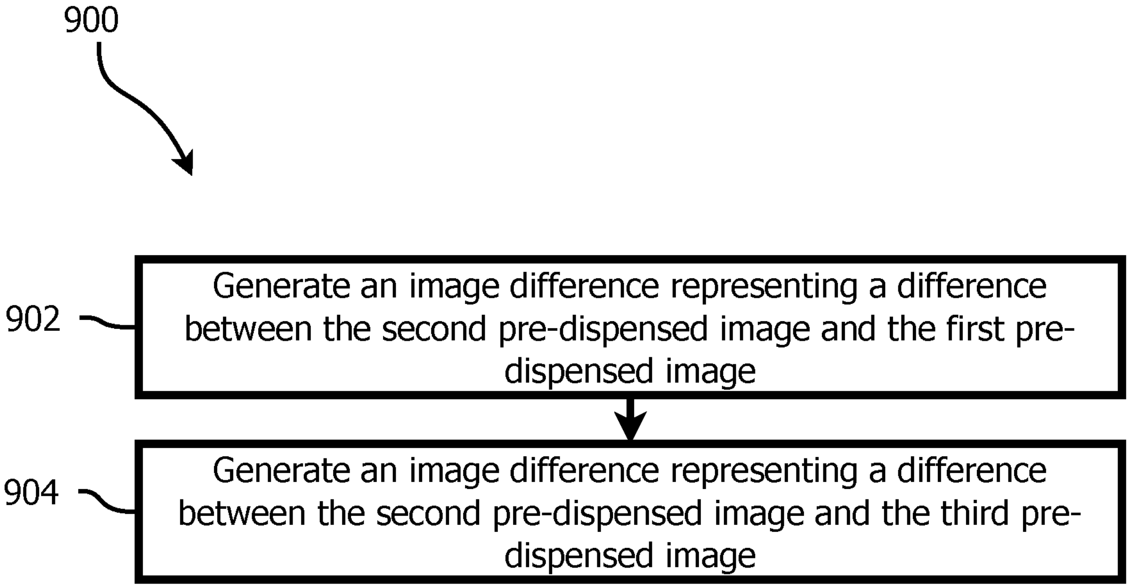
FIG. 8 is a flowchart depicting blocks of code that may be included in the flowchart shown in FIG. 4 in accordance with various embodiments.

In various embodiments, block 202 of the flowchart 200 shown in FIG. 4 may include the blocks of code shown at 900 in FIG. 8. Referring to FIG. 8, block 902 directs the controller processor 100 to generate an image difference representing a difference between the second pre-dispensed image and the first pre-dispensed image. In some embodiments, block 902 may direct the controller processor 100 to subtract the first pre-dispensed image from the second pre-dispensed image and to store the result as a second image difference in the location 154 of the storage memory 104.

Referring still to FIG. 8, block 904 directs the controller processor 100 to generate an image difference representing a difference between the third pre-dispensed image and the second pre-dispensed image. In some embodiments, block 902 may direct the controller processor 100 to subtract the second pre-dispensed image from the third pre-dispensed image and to store the result as a second image difference in the location 156 of the storage memory 104.

In various embodiments, the difference of the images may be taken in order to remove static features within the images leaving only the cells suspended within the nozzle's channel. In some embodiments, this may facilitate improved performance in determining dispensed particle counts, since extraneous information may be removed. In various embodiments, the subtracted images may be calculated according to the following formula.

$$\left\lfloor \frac{(IM_{t=0} - IM_{t=-1}) + 255}{2} \right\rfloor$$

where the subtraction is a pixelwise subtraction of the two images and the pixelwise addition of 255 and division by 2 is to normalize the range of pixel values to within 0-255 as used for 8-bit images. In various embodiments, the floor function may ensure that all pixel vales are whole numbers. In various embodiments, an image pixel resolution of 192×313 pixels may be used.

Referring back to FIG. 4, block 204 then directs the controller processor 100 to receive at least one post-dispensed image of the dispensing portion of the droplet dispenser 16 after the droplet has been dispensed. In various embodiments, block 204 may direct the controller processor 100 to produce signals for causing the droplet dispenser 16 to dispense the first droplet of fluid into the first target region of the microplate 30 of the substrate stage 108. In some embodiments, for example, the block may direct the controller processor 100 to transmit instructions to the imager 14 for causing the imager 14 to cause the droplet dispenser 16 to dispense a droplet. In some embodiments, the signals may also trigger the imager 14 to capture and send to the controller 12 at least one post-dispensed image of the dispensing portion of the droplet dispenser 16 after the droplet has been dispensed.

In some embodiments, the droplet dispenser 16 may be configured to dispense low volumes of fluid, such as, for example, volumes of about 250 pL per droplet.

Figure 9:
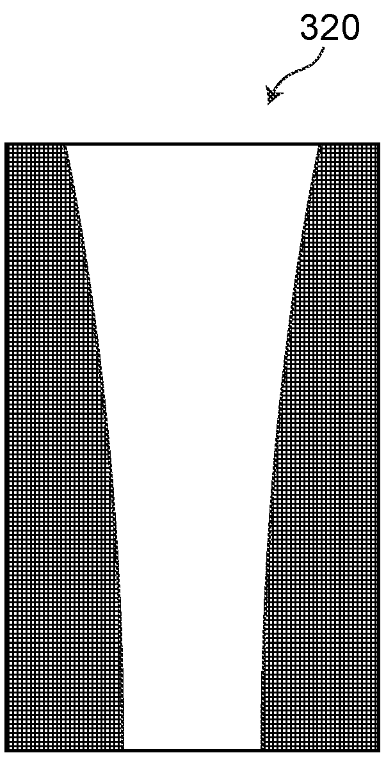
FIG. 9 is a representation of a post-dispensed image that may be used in the system shown in FIG. 1 in accordance with various embodiments.

In some embodiments, for example, the signals transmitted to the imager 14 for causing the imager to cause the droplet dispenser 16 to dispense the droplet may have triggered the imager 14 capturing and sending to the controller 12, a post-dispensed image 320 as shown in FIG. 9 of the inkjet nozzle shown in FIG. 2, the post-dispensed image taken after the first droplet was dispensed by the droplet dispenser 16 to the first target region of the microplate 30. Block 204 may direct the controller processor 100 to receive the post-dispensed image 320 via the interface 120 of the I/O interface 112 shown in FIG. 3. In some embodiments, block 204 may direct the controller processor 100 to store the post-dispensed image 320 in the location 150 of the storage memory 104 shown in FIG. 3.

In some embodiments, block 204 may include a block generally similar to the blocks 902 or 904 included in the flowchart 900 shown in FIG. 8, such that execution of block 204 directs the controller processor 100 to generate a first image difference representing a difference between the first pre-dispensed image and the post-dispensed image. In various embodiments, block 204 may direct the controller processor 100 to store the first image difference in the location 152 of the storage memory 104.

Accordingly, in various embodiments, after blocks 202 and 204 have been executed, image differences acting as representations of the first, second, and third pre-dispensed images 240, 248, and 254 as shown in FIGS. 5, 6, and 7 and the post-dispensed image 320 as shown in FIG. 9 may be stored in the locations 152, 154, and 156 of the storage memory 104. In some embodiments, the image differences stored in the locations 152, 154, and 156 may be stored as a single RGB color image in the storage memory 104 with the first, second, and third image differences acting as the R, G, and B values respectively of the RGB color image. In some embodiments, storing the images as a single image or 3D array may make it easier to perform operations on the images. For example, a roll function may be used when adding a new image to the red channel. In some embodiments, the input shape to the neural network may be a 3D array, and so storing the image differences as a 3D array or a single color image may facilitate no further operations on the images being required when running a prediction. In some embodiments, if the image differences are stored as three separate images then a concatenation step may be required first to create a 3D array before being input into the neural network. In some embodiments, saving the image differences as an RGB image may facilitate human inspection as such RGB images may be easy to visually inspect.

Figure 10:
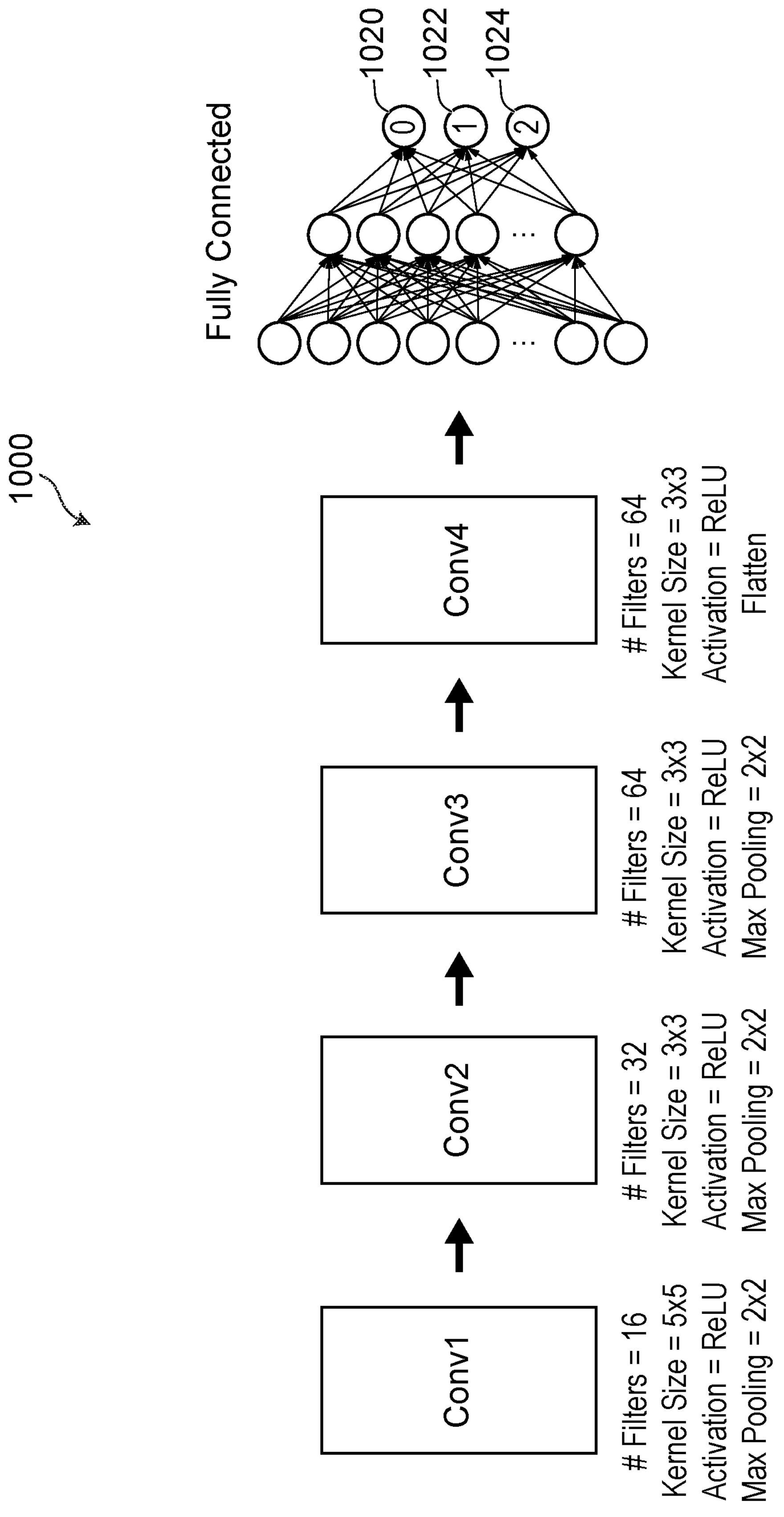
FIG. 10 is a representation of a neural network that may be used in the system shown in FIG. 1 in accordance with various embodiments.

Referring back to FIG. 4, the flowchart 200 continues at block 206, which directs the controller processor 100 to compare the at least one pre-dispensed image and the at least one post-dispensed image to determine a particle count representing a count of particles included in the dispensed droplet. In some embodiments, block 206 may direct the controller processor 100 to cause a representation of the at least one pre-dispensed image and the at least one post-dispensed image to be input into one or more functions. For example, in some embodiments, block 206 may direct the controller processor 100 to input the image differences stored in the locations 152, 154, and 156 of the storage memory 104 into a neural network, such as the convolutional neural network (CNN) 1000 as shown in FIG. 10.

In some embodiments, the CNN 1000 may have been previously trained such that the CNN is configured to receive as input, the first second, and third image differences and to output first, second, and third count confidences 1020, 1022, and 1024 each associated with a respective prospective particle count or class. In various embodiments, the first count confidence 1020 may represent a confidence that the first droplet includes 0 particles, the second count confidence 1022 may represent a confidence that the first droplet includes 1 particle, and the third count confidence 1022 may represent a confidence that the first droplet includes 2 or more particles.

Parameters defining the CNN 1000, which may have been obtained during training, may be stored in the location 158 of the storage memory 104.

In some embodiments, for example, block 206 may direct the controller processor 100 to retrieve the first, second, and third image differences from the locations 152, 154, and 156 of the storage memory 104 and to input the first, second, and third image differences into the CNN 1000. Block 206 may direct the controller processor 100 to retrieve the parameters defining the CNN 1000 from the location 158 of the storage memory 104 and to process the input to generate first, second, and third count confidences. For example, in some embodiments, the first, second and third count confidences may be generated or determined to be 0.02, 0.96, and 0.02 respectively, when the first, second, and third image differences are input.

In various embodiments, the size and hyperparameters used in the CNN 1000 used in block 206 may be as follows:

| Layers: | Parameters: |
|---|---|
| 2D Convolutional Layer 1 | Kernel Size = 5 × 5, # Filters = 16, Activation = ReLu |
| 2D Convolutional Layer 2 | Kernel Size = 3 × 3, # Filters = 32, Activation = ReLu |
| 2D Convolutional Layer 3 | Kernel Size = 3 × 3, # Filters = 64, Activation = ReLu |
| 2D Convolutional Layer 4 | Kernel Size = 3 × 3, # Filters = 64, Activation = ReLu |
| Fully Connected Layer 1 | # Nodes = 256, Activation = ReLu |
| Fully Connected Layer 2 | # Nodes = 512, Activation = ReLu |
| Output Layer | # Nodes = 3, Activation = Softmax |

In some embodiments, block 206 may direct the controller processor 100 to determine a subject droplet particle count based on the determined count confidences, the subject droplet particle count being a count of particles expected to be in the droplet that was most recently dispensed. In some embodiments, block 206 may direct the controller processor 100 to determine the subject droplet particle count to be the particle count associated with the largest of the plurality of count confidences. In various embodiments, block 206 may direct the controller processor 100 to store the determined subject droplet particle count in the location 160 of the storage memory 104.

Accordingly, in various embodiments, where the largest count confidence of 0.96 is the second count confidence associated with a particle count of 1, block 206 may direct the controller processor 100 to determine the subject droplet particle count to be 1 and to store the subject droplet particle count of 1 in the location 160 of the storage memory 104.

In various embodiments, where the largest count confidence is the first count confidence associated with a particle count of 0, block 206 may direct the controller processor 100 to determine the subject droplet particle count to be 0 and to store the subject droplet particle count of 0 in the location 160 of the storage memory 104.

In various embodiments, where the largest count confidence is the third count confidence associated with a particle count of 2 or more, block 206 may direct the controller processor 100 to determine the subject droplet particle count to be 2 or more and to store the subject droplet particle count of 2 in the location 160 of the storage memory 104.

In various embodiments, block 206 may direct the controller processor 100 to store the largest count confidence in the location 161 of the storage memory 104. In various embodiments, the count confidence may be later used to assess validity of the determined particle count and/or any other resulting count.

In various embodiments, after the subject droplet particle count is determined and stored in the location 160 of the storage memory 104, the controller processor 100 may proceed to block 208.

Referring back to FIG. 4, block 208 may direct the controller processor 100 to produce signals for associating a representation of the droplet particle count with the target region. In some embodiments, for example, block 208 may direct the controller processor 100 to produce signals for causing a dispensed particle count to be stored, which may represent a total number of particles dispensed in droplets to a target region. In various embodiments, the dispensed particle count may represent or include the subject droplet particle count. Block 208 may direct the controller processor 100 to store the dispensed particle count in a target count record in association with the target region.

In various embodiments, the dispensed particle count may be stored in the location 162 of the storage memory 104 and may represent a total running count of a number of particles dispensed to a target region. In some embodiments, the dispensed particle count may be incremented by the subject droplet particle count for each droplet dispensed to a target region and reset to 0 whenever a new target region is to be dispensed into.

In some embodiments, block 208 may direct the controller processor 100 to first determine whether one or more further droplets should be dispensed to the target region before associating the dispensed particle count with the target region. In some embodiments, if further droplets are to be dispensed to the target region, block 208 may direct the controller processor 100 to treat the present post-dispensed image as a pre-dispensed image for a further droplet to be dispensed. Block 208 may direct the controller processor 100 to execute blocks generally similar to blocks 204, 206, and 208 of the flowchart 200 shown in FIG. 4, but dispensing a further droplet to the target region. In such embodiments, a block generally similar to block 206 may direct the controller processor 100 to update the dispensed particle count stored in the location 162 to include a count of particles included in a second droplet summed with the count of particles included in the first droplet in a total dispensed particles count and a block generally similar to the block 208 may treat the total dispensed particle count generally as described above.

Figure 11:
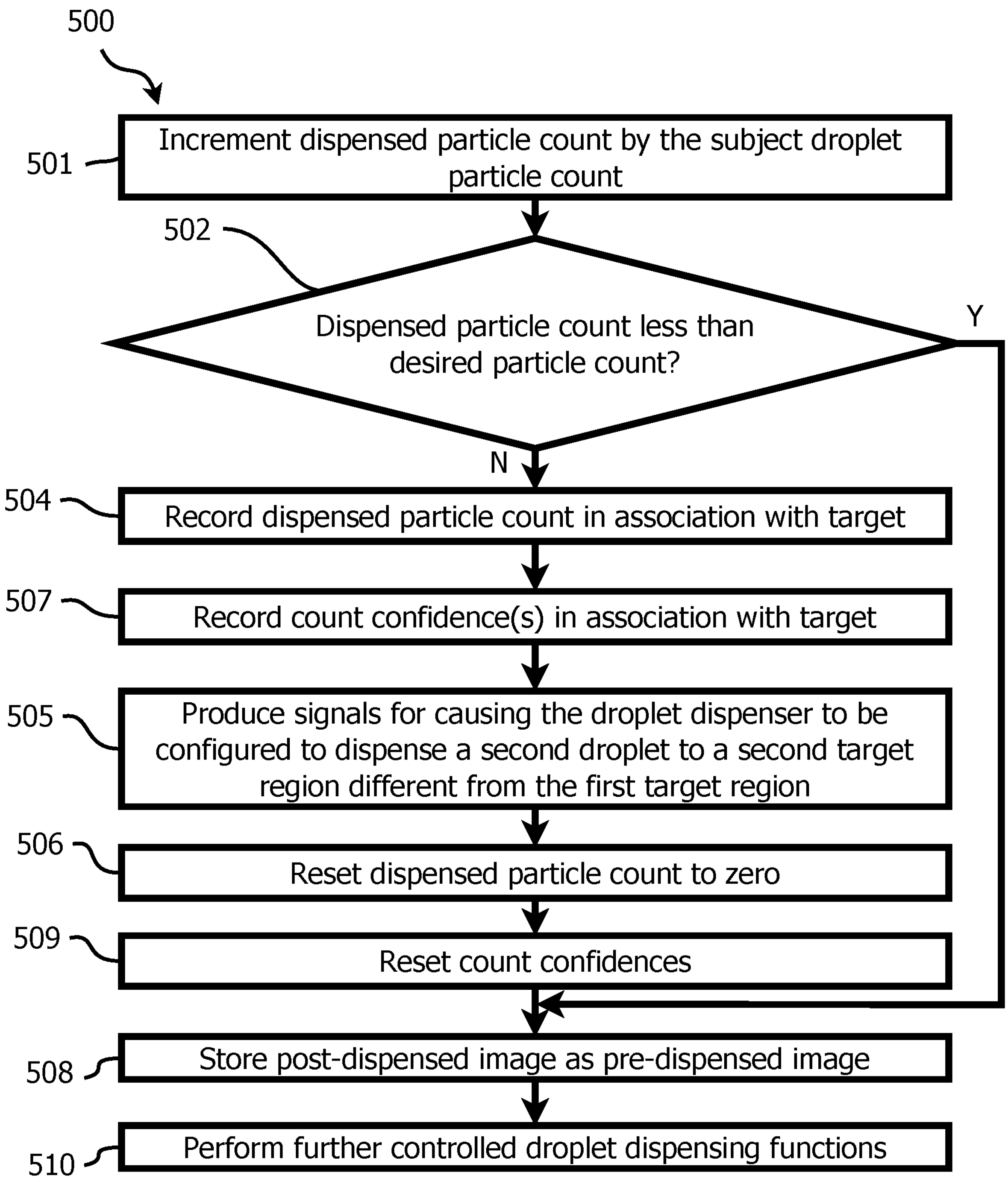
FIG. 11 is a flowchart depicting blocks of code that may be included in the flowchart shown in FIG. 4 in accordance with various embodiments.

Referring to FIG. 11, there is shown a flowchart 500 including blocks of code that may be included in block 208 in various embodiments. The flowchart 500 begins with block 501, which directs the controller processor 100 to increment the dispensed particle count by the subject droplet particle count. In some embodiments, block 501 may direct the controller processor 100 to read the subject droplet particle count from the location 160 of the storage memory 104, to add it to the dispensed particle count stored in the location 162 of the storage memory and to store the result in the location 162 of the storage memory as the dispensed particle count.

Block 502 then directs the controller processor 100 to determine whether the dispensed particle count is less than a desired particle count. In some embodiments, for example, the desired particle count may have been previously set by a user, for example, and stored in the location 164 of the storage memory 104. In some embodiments, the desired particle count may be 1, such as, for example, where single cells or particles are to be dispensed. Block 502 may direct the controller processor 100 to compare the dispensed particle count stored in the location 162 of the storage memory 104 to the desired particle count stored in the location 164 of the storage memory 104.

If the dispensed particle count is not less than the desired particle count, (i.e., the dispensed particle count is equal to or greater than the desired particle count) then this may indicate that no more particles should be dispensed to the current target region, either because the desired number of particles have been dispensed or too many have already been dispensed. In either case, dispensing to the current target region may be complete and a new target should be used and so block 502 may direct the controller processor 100 to proceed to block 504.

Block 504 directs the controller processor 100 to record the dispensed particle count in association with the target region. In various embodiments, block 504 may direct the controller processor 100 to copy the dispensed particle count or class from the location 162 of the storage memory 104 shown in FIG. 3 to a first target total count field 1062 of a target count record 1060 as shown in FIG. 12, which may be stored in the location 166 of the storage memory 104. In various embodiments, the target count record 1060 may include target total count fields, some of which are shown at 1062-1070, for storing particle counts associated with each target region of the microplate 30. In some embodiments, the target count fields may be initialized to 0 and updated as block 504 is executed for each target region. In various embodiments, where the microplate includes a 72×72 grid of target regions, for example, the target count record 1060 may include 5184 target count fields. In some embodiments, a subset of the grid may be used and so fewer than 5184 target count fields may be included. In some embodiments, the target count record 1060 may be stored as an array of numbers representing particle counts, with each position in the array corresponding to a target region of the microplate 30.

Referring to FIG. 11, in various embodiments, the flowchart 500 may include block 507 which directs the controller processor 100 to record a count or class confidence in association with each count, for example zero, single, or multiple particles, and in association with the target region. In various embodiments, block 507 may direct the controller processor 100 to copy the stored count confidence(s), which may in some embodiments include a respective maximum count confidence and the corresponding count, associated with each droplet dispensed to the target region, from the location 161 of the storage memory 104 shown in FIG. 3 to a count confidence field 1102 of a target count confidence record 1100 as shown in FIG. 13, which may be stored in the location 168 of the storage memory 104. In various embodiments, the target count record 1100 may include target count confidence fields, some of which are shown at 1102-1108, for storing the largest of the three predicted count confidences and its corresponding count associated with each target region of the microplate 30. In some embodiments, the target count fields may be initialized to 0 and updated as block 507 is executed for each target region. In some embodiments, more than one count confidence may be stored in the location 161 of the storage memory 104 and so block 507 may direct the controller processor 100 to store more than one count confidence in the target count confidence record 1100 in association with a particular target region.

Referring to FIG. 11, in various embodiments, the flowchart 500 may include block 505 which may direct the controller processor 100 to produce signals for causing the droplet dispenser 16 to be configured to dispense a second or subsequent droplet to a next or second target region different from the initial subject or first target region. In some embodiments, block 505 may direct the controller processor 100 to communicate with the substrate stage 18 via the interface 124 of the I/O interface 112 to cause the substrate stage 18 to move the microplate 30 such that the dispensing portion 52 shown in FIG. 2 is above a new target region different from the first target region and any target region to which a droplet was previously dispensed. In some embodiments, if at block 505 the controller processor 100 determines that there are no further target regions, the flowchart 500 may end.

Referring still to FIG. 11, after block 505 is executed, block 506 may direct the controller processor 100 to reset the dispensed particle count stored in the location 162 to zero to reflect that a new target is being dispensed into.

In various embodiments, the flowchart 500 may include block 509, which may direct the controller processor 100 to reset the count confidence by deleting the count confidences stored in the location 161.

After block 509 or if at block 502 it is determined that the particle count is less than the desired particle count, the controller processor 100 may proceed to block 508 which directs the controller processor 100 to store or use the current post-dispensed image as a pre-dispensed image when considering the next droplet to be dispensed. In some embodiments, block 508 may direct the controller processor 100 to also update how the pre-dispensed images are considered for the next droplet, for example, by treating the current first pre-dispensed image as the second pre-dispensed image when considering the next droplet to be dispensed, and by treating the current second pre-dispensed image as the third pre-dispensed image when considering the next droplet to be dispensed.

For example, in some embodiments, block 508 may direct the controller processor 100 to cause the first image difference data stored in the location 152 to become second image difference data stored in the location 154 and to cause the second image difference data to become third image difference data stored in the location 156. In some embodiments, block 508 may direct the controller processor 100 to move the image stored in the location 150 to the location 140, to cause the current post-dispensed image to become the first pre-dispensed image when considering the next droplet to be dispensed. Block 508 may similarly direct the controller processor 100 to move the image stored in the location 140 to the location 142, to cause the current first pre-dispensed image to become the second pre-dispensed image when considering the next droplet to be dispensed and to move the image stored in the location 142 to the location 144, to cause the current second pre-dispensed image to become the third pre-dispensed image when considering the next droplet to be dispensed.

Referring to FIG. 11, block 510 then directs the controller processor 100 to perform further controlled droplet dispensing functions. In some embodiments, block 510 may direct the controller processor 100 to return to execute blocks generally similar to blocks 204, 206, and 208 of the flowchart 200 shown in FIG. 4, but either dispensing a further droplet to the target region (if block 502 directed the controller processor 100 to proceed to block 508, for example) or dispensing a droplet to a new target region (if blocks 504, 507, 505, 506, and 509 have been executed, for example).

In such embodiments, where block 502 directed the controller processor 100 to proceed to block 508, a block generally similar to block 206 may direct the controller processor 100 to include a count of particles included in a second droplet with the count of particles included in the first droplet in the total dispensed particles count and a block generally similar to the block 208. In various embodiments, block 206 may direct the controller processor 100 to include the largest count confidence in a set or array of count confidences stored in the location 161 of the storage memory 104.

In various embodiments, once the flowchart 200 has generally been executed for each target region, the target count record 1060 shown in FIG. 12 may include a value stored for each target count field, the value representing a number of particles dispensed into that target region.

In various embodiments, the target count confidence record 1100 shown in FIG. 13 may include at least one value stored in each target count confidence field, the values representing respective confidences that droplets dispensed into the associated target region had particular counts.

Figure 14:
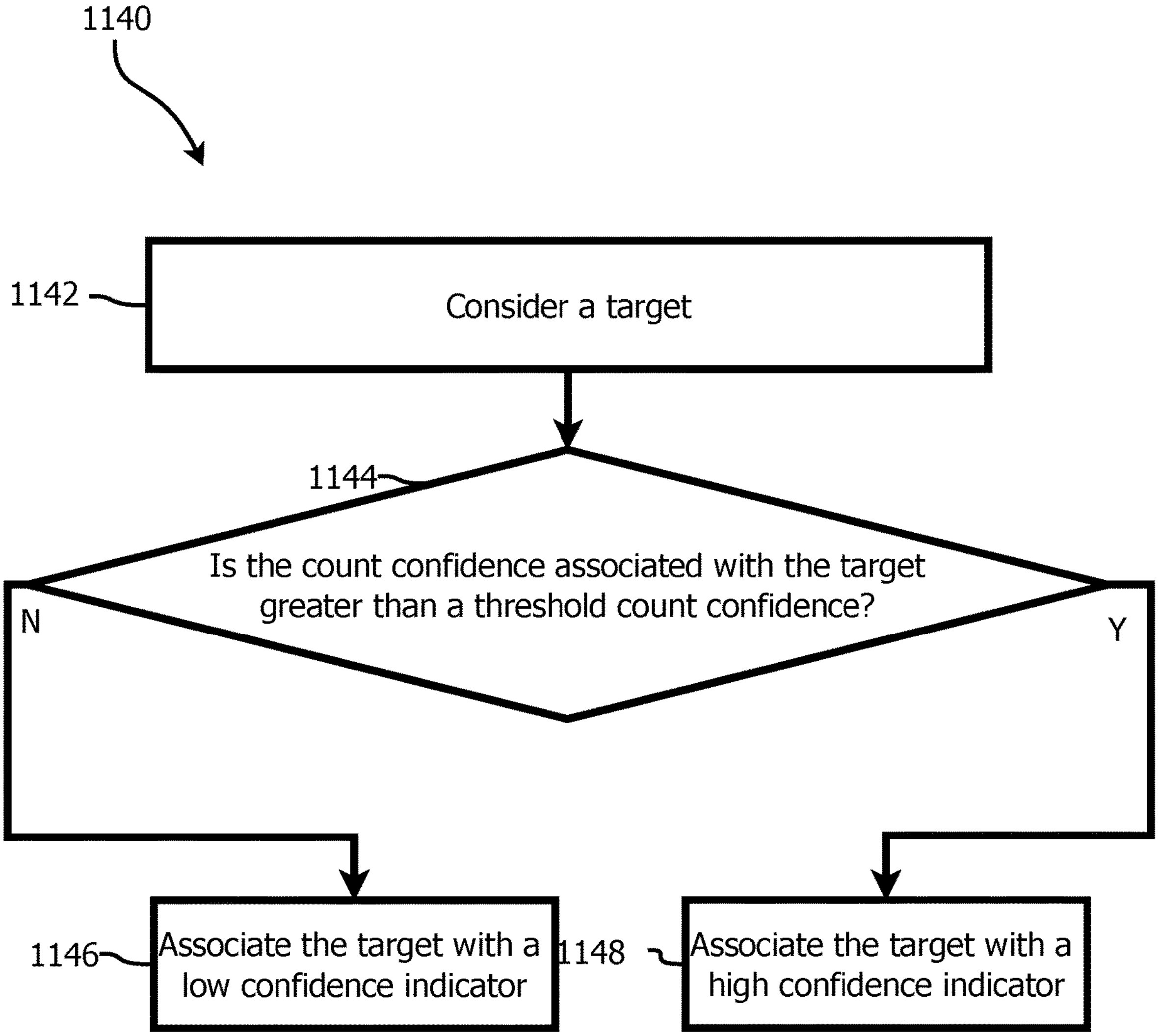
FIG. 14 is a flowchart depicting blocks of code that may be included in the flowchart shown in FIG. 4 in accordance with various embodiments.

In some embodiments, the block of codes 190 of the program memory 102 may include blocks of code as shown in flowchart 1140 shown in FIG. 14. In various embodiments, the flowchart 1140 may be executed when a user wishes to view counts associated with the target regions. In some embodiments, the flowchart 1140 may be executed for each target region. The flowchart 1140 begins with block 1142, which directs the controller processor 100 to consider a target region. In some embodiments, upon a first execution of the flowchart 1140, block 1142 may direct the controller processor 100 to consider the first target region. In various embodiments, the flowchart 1140 may be executed repeatedly, but considering a different target region each time, until all of the target regions have been considered. In some embodiments, only target regions associated with a desired particle count may be considered. For example, in some embodiments, where single particle or single cell targets are desired, block 1142 may direct the controller processor 100 to consider only target regions associated with a particle count equal to 1.

Block 1144 then directs the controller processor 100 to determine whether the count confidence associated with the target region is greater than a threshold count confidence. In some embodiments, block 1144 may direct the controller processor 100 to determine whether the count confidence for a desired particle count, such as a count of 1, for example, associated with the target regions is greater than a threshold count confidence. In some embodiments, where more than one count confidence is associated with a target region, block 1144 may direct the controller processor 100 to determine whether all of the count confidences are greater than a threshold count confidence. In some embodiments, the threshold count confidence may have been set previously and may be stored in the location 170 of the storage memory 104. For example, in some embodiments, the threshold count confidence may have been set to 0.95.

In some embodiments, block 1144 may direct the controller processor 100 to read a target count confidence associated with the considered target region from the target count confidence record 1100 stored in the location 168 of the storage memory and the threshold count confidence from the location 170 of the storage memory 104 and to compare the values to determine whether the target count confidence is greater than the threshold count confidence. If at block 1144, it is determined that the target count confidence is not greater than the threshold count confidence, block 1144 may direct the controller processor 100 to proceed to block 1146. Alternatively, if it is determined that the target count confidence is greater than the threshold count confidence, block 1144 may direct the controller processor 100 to proceed to block 1148.

Block 1146 directs the controller processor 100 to associate the target region with a low confidence indicator and block 1148 directs the controller processor 100 to associate the target region with a high confidence indicator. In various embodiments, blocks 1146 and 1148 may direct the controller processor 100 to populate a target count validity record 1180 as shown in FIG. 15 with a value of "INVALID" or "VALID" respectively. In various embodiments, the target count validity record 1180 may be stored in the location 172 of the storage memory 104 and may be used to indicate which of the counts included in the target particle count record represent valid or reliable data regarding the count of particles in the associated target region.

In some embodiments, the system 10 shown in FIG. 1 may include a display in communication with the controller 12 and the block of codes 190 of the program memory 102 may include code for directing the controller processor 100 shown in FIG. 3 to communicate with the display to cause a representation of the target count record 1060, the target count confidence record 1100, and/or the target count validity record 1180 to be displayed by the display to a user. In some embodiments, the user may view the display and use the information as required for their application.

In some embodiments, for example, the user may view the display and identify target regions or positions which contain only a single cell for downstream processing (e.g. adding reagents for Polymerase chain reaction ("PCR") and library preparation) while omitting the other target regions from downstream processing. In some embodiments, for example in monoclonal antibody development the target particle count record may be used to prove clonality of cultured cells.

In some embodiments, the target count record 1060, the target count confidence record 1100, and/or the target count validity record 1180 may be saved in one or more files that may be used later on and/or sent to another device/system for use.

Neural Network Training

Figure 16:
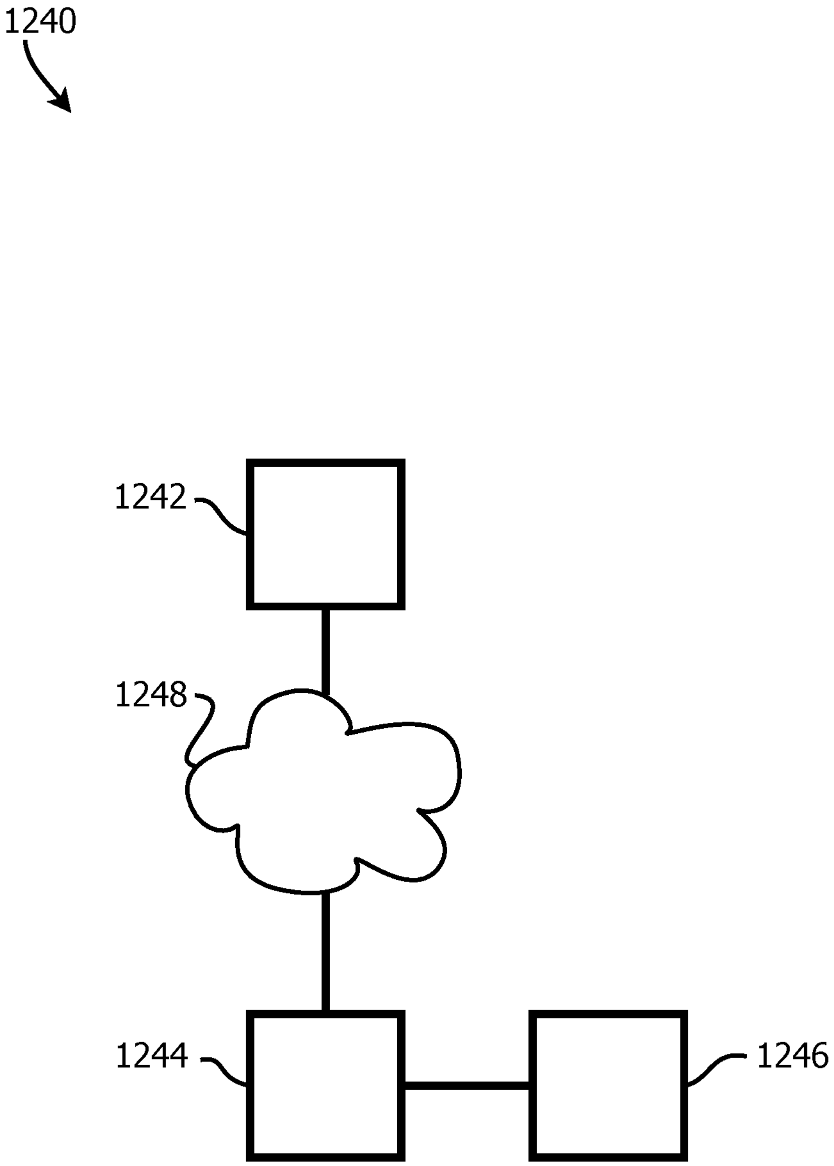
FIG. 16 is a schematic view of a system for facilitating controlled particle deposition including neural network training in accordance with various embodiments.

As discussed above, in various embodiments, parameters defining the CNN 1000 shown in FIG. 10 may be stored in the location 158 of the storage memory 104 of the controller 12 shown in FIG. 3. In some embodiments, the parameters may have been generated during neural network training. Referring now to FIG. 16 there is shown a system 1240 for controlled particle deposition including neural network training, in accordance with various embodiments.

Referring to FIG. 16, the system 1240 includes a system 1242 for facilitating controlled particle deposition, which may be generally similar to the system 10 shown in FIG. 1 and may include a controller generally similar to the controller 12 shown in FIG. 3. In various embodiments, the system 1240 may also include a controlled particle deposition trainer 1244 in communication with a particle deposition training data source 1246. In various embodiments, the system 1242 may be in communication with the trainer 1244 via a network 1248, which may in some embodiments, include the Internet, and/or remote mass storage for example.

In operation, the trainer 1244 may be configured to use controlled particle deposition training data received from the training data source 1246 to train the CNN 1000 shown in FIG. 10. In some embodiments, the trainer 1244 may be configured to provide data defining the trained CNN to the controller of the system 1242 shown in FIG. 16. In some embodiments, the CNN 1000 shown in FIG. 10 may be trained from a complete data set providing known target particle count records for sets of pre-dispensed and post-dispensed images. For example, in some embodiments, the training data may have been obtained through experiment and analysis of droplets dispensed using the system 1242 or another similar system.

Figure 17:
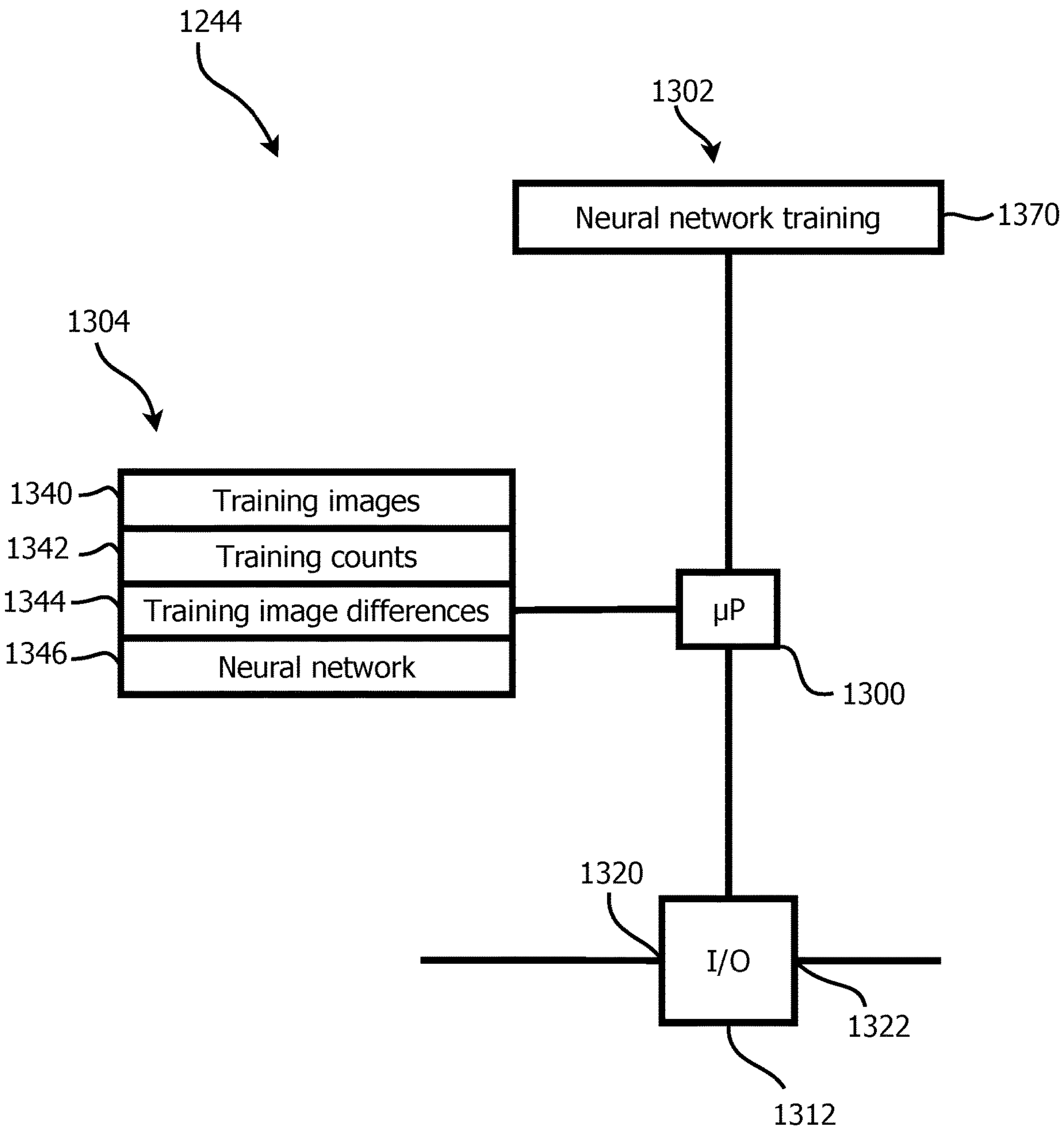
FIG. 17 is a schematic view of a controlled particle deposition trainer of the system shown in FIG. 16 including a processor circuit according to various embodiments.

Referring to FIG. 17, a schematic view of the trainer 1244 of the system 1240 shown in FIG. 16 according to various embodiments is shown. In various embodiments, elements of the trainer 1244 that are similar to elements of the controller 12 shown in FIG. 3 may function generally as described above having regard to the controller 12 shown in FIG. 3.

Referring to FIG. 17, the trainer 1244 includes a processor circuit including a trainer processor 1300 and a program memory 1302, a storage memory 1304, and an input/output (I/O) interface 1312, all of which are in communication with the trainer processor 1300.

The I/O interface 1312 includes an interface 1320 for communicating with the training data source 1246 shown in FIG. 16 and an interface 1322 for communicating with the controller of the system 1242 via the network 1248 shown in FIG. 16.

Processor-executable program codes for directing the trainer processor 1300 to carry out various functions are stored in the program memory 1302. Referring to FIG. 17, the program memory 1302 includes a block of codes 1370 for directing the trainer 1244 to perform facilitating controlled particle deposition neural network training functions.

The storage memory 1304 includes a plurality of storage locations including location 1340 for storing training image data, location 1342 for storing training count data, location 1344 for storing training image difference data, and location 1346 for storing neural network data.

In some embodiments, the program memory 1302, the storage memory 1304, and/or any portion thereof may be included in a device separate from the trainer 1244 and in communication with the trainer 1244 via the I/O interface 1312, for example. In some embodiments, the functionality of the trainer processor 1300 and/or the trainer 1244 as described herein may be implemented using a plurality of processors and/or a plurality of devices, which may be distinct devices which are in communication via respective interfaces and/or a network, such as the Internet, for example.

Figure 18:
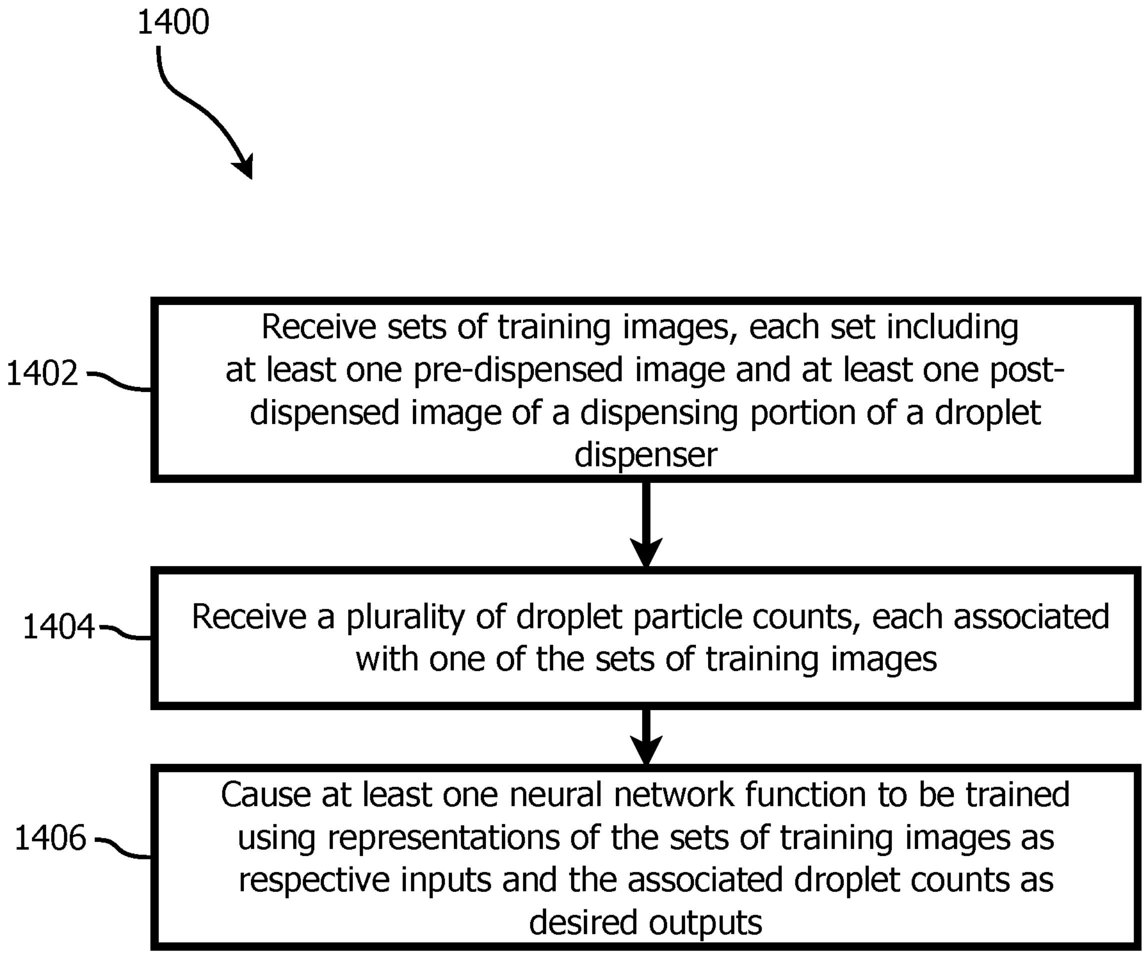
FIG. 18 is a flowchart depicting blocks of code for directing the trainer shown in FIG. 17 to perform particle deposition control functions in accordance with various embodiments.

In various embodiments, the trainer 1244 shown in FIGS. 16 and 17 may be configured to facilitate controlled particle deposition neural network training. Referring to FIG. 18, a flowchart depicting blocks of code for directing the trainer processor 1300 shown in FIG. 17 to perform controlled particle deposition neural network training functions in accordance with various embodiments is shown generally at 1400. The blocks of code included in the flowchart 1400 may be encoded in the block of codes 1370 of the program memory 1302 shown in FIG. 17, for example.

Referring to FIG. 18, the flowchart 1400 begins with block 1402 which directs the trainer processor 1300 to receive a plurality of sets of training images, each of the sets of training images including at least one pre-dispensed image of a dispensing portion of a droplet dispenser, the dispensing portion including fluid to be dispensed in a droplet to a target region, and at least one post-dispensed image of the dispensing portion of the droplet dispenser after the droplet has been dispensed.

Block 1404 then directs the trainer processor 1300 to receive a plurality of droplet particle counts, each of the droplet particle counts associated with one of the sets of training images and representing a count of particles dispensed in a droplet that is the subject of the associated set of training images.

In some embodiments, for example, the training data source 1246 may have previously been provided with training data including sets of training images and associated droplet counts. In some embodiments, for example, the training data source 1246 may have stored thereon training data many training data sets, each including a first, a second, and a third pre-dispensed image and a post-dispensed image, all associated with a droplet particle count. For example, in some embodiments, the training data may include many images having subsets therein associated with droplet particle counts, which may have been determined through experiment and inspection. Each subset of images may include a first, a second, and a third pre-dispensed image and a post-dispensed image which would be associated with the droplet particle count generally as described above.

Referring back to FIG. 18, block 1402 may direct the trainer processor 800 to receive a message including a representation of the training images stored in the training data source 1246 via the interface 1320, for example. In some embodiments, block 1402 may direct the trainer processor 1300 to store the training images in the location 1340 of the storage memory 1304 shown in FIG. 17.

Block 1404 may direct the trainer processor 1300 to receive a message including a representation of the droplet particle counts stored in the training data source 1246 via the interface 1320, for example, each droplet particle count associated with a set of training images. In some embodiments, block 1404 may direct the trainer processor 1300 to store the droplet particle counts in the location 1342 of the storage memory 1304 shown in FIG. 17.

In some embodiments, blocks 1402 and 1404 may be executed concurrently and the sets of training images and associated droplet particle counts may be received contemporaneously.

Referring to FIG. 18, block 1406 directs the trainer processor 1300 to cause at least one neural network function to be trained using representations of the sets of training images as respective inputs and the associated droplet counts as desired outputs. In some embodiments, block 1406 may direct the trainer processor 1300 to train the CNN 1000 shown in FIG. 10 using the training images and droplet particle counts stored in the locations 1340 and 1342.

In some embodiments, initial neural network data defining the architecture of the CNN 1000 may be stored in the location 1346 of the storage memory 1304. In various embodiments, the initial neural network data may have been previously provided when setting up the trainer 1244, for example.

In some embodiments, block 1406 may direct the trainer processor 1300 to, for each set of training images, generate first, second, and third image differences generally as described above having regard to block 206 of the flowchart 200 shown in FIG. 4. In various embodiments, block 1406 may direct the trainer processor 1300 to use the generated first, second, and third image differences as the inputs for the CNN 1000 as shown in FIG. 10. In some embodiments, block 1406 may direct the trainer processor 1300 to set the desired output based on the droplet particle count by setting the desired outputs for the count confidences according to the training droplet particle count associated with the input training images. For example, in some embodiments, the desired output for a count confidence that is associated with a droplet particle count that matches the training droplet particle count may be set to 1.00 and the desired outputs for the other count confidence outputs may be set to 0.

In some embodiments, block 1406 may direct the trainer processor 1300 to use categorical cross entropy as a loss function for training. In various embodiments, block 1406 may direct the trainer processor 1300 to determine parameters systematically by running Hyperband tuning to determine the hyperparameters such as the # of layers to use. During training an Adam optimizer may be used with a learning rate of 0.0001, for example. In some embodiments, Hyperband tuning may be used to determine an optimal learning rate. In various embodiments, properties of the CNN 1000 including, for example, hyperparameters, may be subject to change given new data.

In various embodiments, after block 1406 has been executed, data defining a trained controlled particle deposition neural network may be stored in the location 1346 of the storage memory 1304 of the trainer 1244 shown in FIG. 17.

In some embodiments, the flowchart 1400 may include a block for directing the trainer processor 1300 to produce signals representing the trained neural network for causing a representation of the trained neural network to be transmitted to the controller of the system 1242 shown in FIG. 16. In some embodiments, the controller of the system 1242 may include a processor circuit generally as shown in FIG. 3 and may direct a controller processor of the controller to store the representation of the trained neural network in a location similar to the location 158 of the controller 12 shown in FIG. 3. In various embodiments, the controller may be configured to execute the flowchart 200 shown in FIG. 4, generally as described above, using the trained neural network stored in memory.

Controller Alternative Embodiments

In various embodiments, controllers generally similar to the controller 12 may be used which use alternative implementations of the flowchart 200 shown in FIG. 4. For example, in some embodiments, a controller 1500 as shown in FIG. 19 may be used in in place of the controller 12 shown in FIG. 3 in the system 10 shown in FIG. 1.

Figure 19:
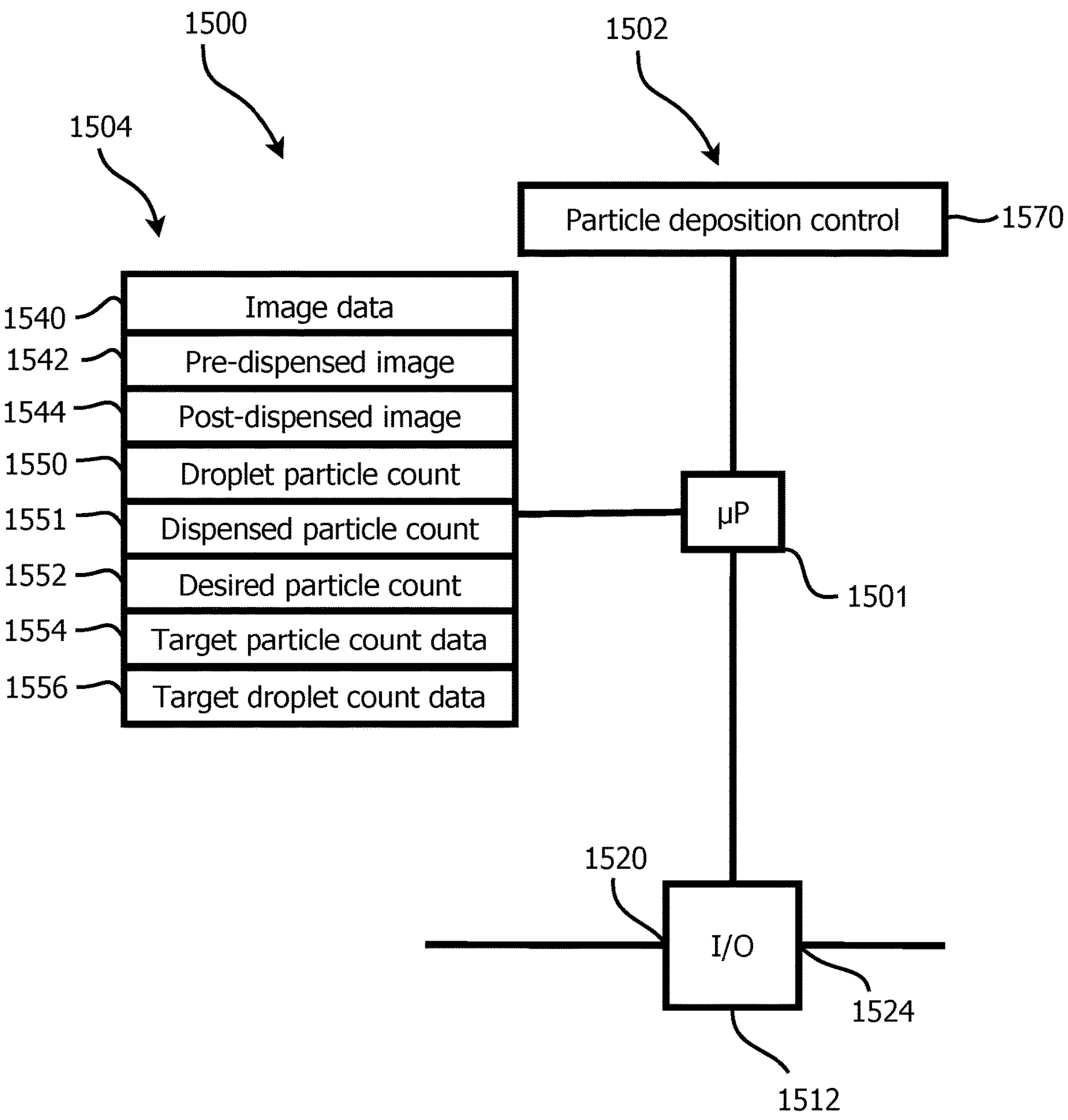
FIG. 19 is a schematic view of a controller that may be included in the system shown in FIG. 1 including a processor circuit according to various embodiments.

In some embodiments, the controller 1500 shown in FIG. 19 may be configured to identify one or more pre-dispensed image particles depicted in at least one pre-dispensed image and to identify one or more post-dispensed image particles depicted in the at least one post-dispensed image. The controller 12 may be configured to identify at least one unmatched pre-dispensed image particle of the one or more pre-dispensed image particles as not matching any of the post-dispensed image particles and therefore as representing a particle included in the dispensed droplet. The controller may be configured to determine a droplet particle count as a count of the at least one unmatched pre-dispensed image particle.

In various embodiments, the controller 1500 may include elements that function generally similar to those of the controller 12. Referring to FIG. 19, the controller 1500 includes a controller processor 1501 and a program memory 1502, a storage memory 1504, and an input/output (I/O) interface 1512, all of which are in communication with the controller processor 1501. The I/O interface 1512 includes an interface 1520 for communicating with the imager 14 and an interface 1524 for communicating with the substrate stage 18. Processor-executable program codes for directing the controller processor 1501 to carry out various functions are stored in the program memory 1502.

Referring to FIG. 19, the program memory 1502 includes a block of codes 1570 for directing the controller 1500 to perform particle deposition control functions.

The storage memory 1504 includes a plurality of storage locations including location 1540 for storing received image data, location 1542 for storing pre-dispensed image representation data, location 1544 for storing post-dispensed image representation data, location 1550 for storing droplet particle count data, location 1551 for storing target dispensed particle count data, location 1552 for storing desired particle count data, and location 1554 for storing target particle count data.

In various embodiments, blocks of code that function generally similar to those included in the flowchart 200 shown in FIG. 4 may be encoded in the block of codes 1570 of the program memory 1502 of the controller 1500 shown in FIG. 19. For example, referring now to FIG. 20, a flowchart depicting blocks of code for directing the controller processor 1501 shown in FIG. 19 to perform particle deposition control functions in accordance with various embodiments is shown generally at 1580. The blocks of code included in the flowchart 1580 may be encoded in the block of codes 1570 of the program memory 1502 shown in FIG. 19, for example.

In various embodiments, the flowchart 1580 begins with block 1582 which directs the controller processor 1501 of the controller 1500 to receive at least one pre-dispensed image of a dispensing portion of the droplet dispenser, the dispensing portion including fluid to be dispensed in a droplet to a target region. In various embodiments, block 1582 may direct the controller processor 1501 to receive a pre-dispensed image 1600 as shown in FIG. 21 from the imager 14 and to store the pre-dispensed image 1600 in the location 1540 of the storage memory 1504.

Figure 20:
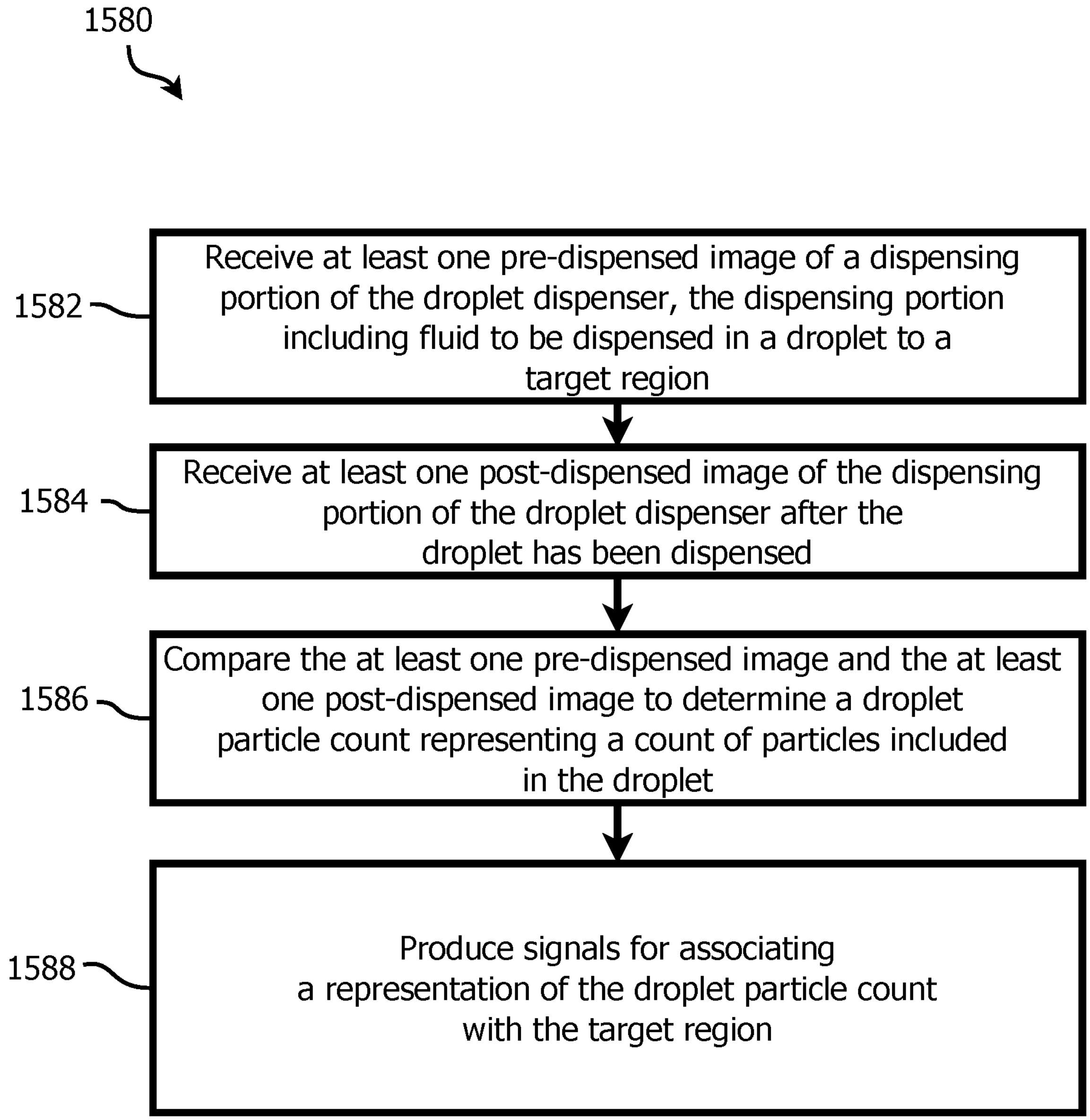
FIG. 20 is a flowchart depicting blocks of code for directing the controller shown in FIG. 19 to perform particle deposition control functions in accordance with various embodiments.
Figure 21:
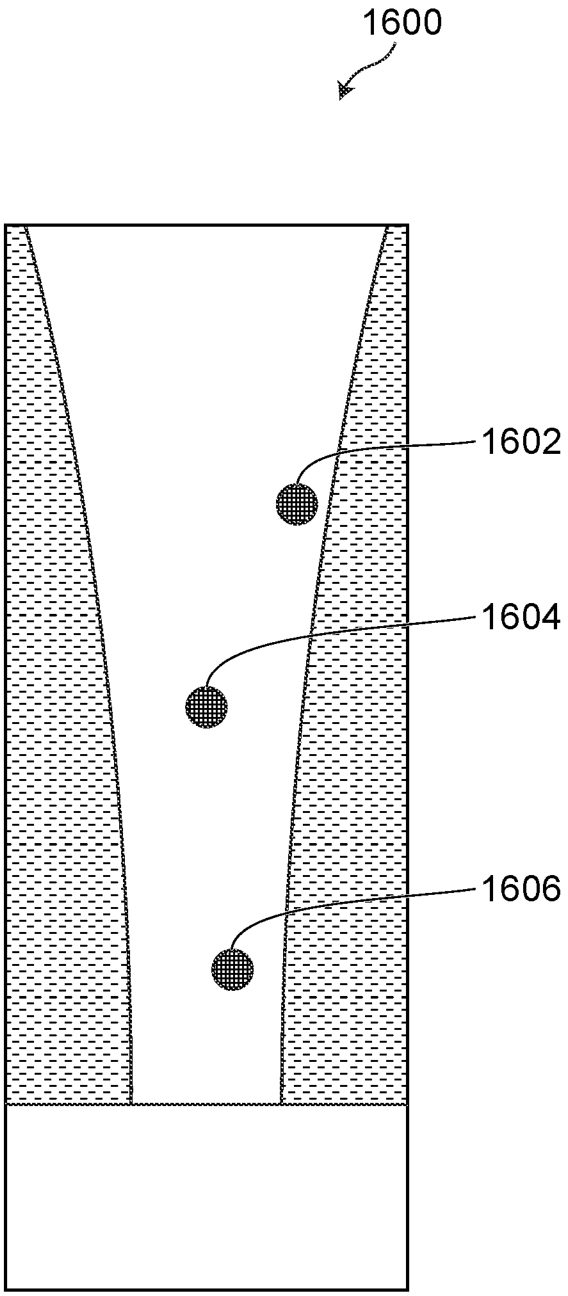
FIG. 21 is a representation of a pre-dispensed image that may be used by the controller shown in FIG. 19 in accordance with various embodiments.

Referring to FIG. 20, in some embodiments, block 1582 may direct the controller processor 1501 to generate a representation of the pre-dispensed image 1600 shown in FIG. 21 and to store the representation of the pre-dispensed image 1600 in the location 1542 of the storage memory 1504. For example, in some embodiments, the block may direct the controller processor 1501 to generate a representation of the particles included in the pre-dispensed image 1600 and to store the representation of the particles in the location 1542 of the storage memory 1504.

Figure 22:
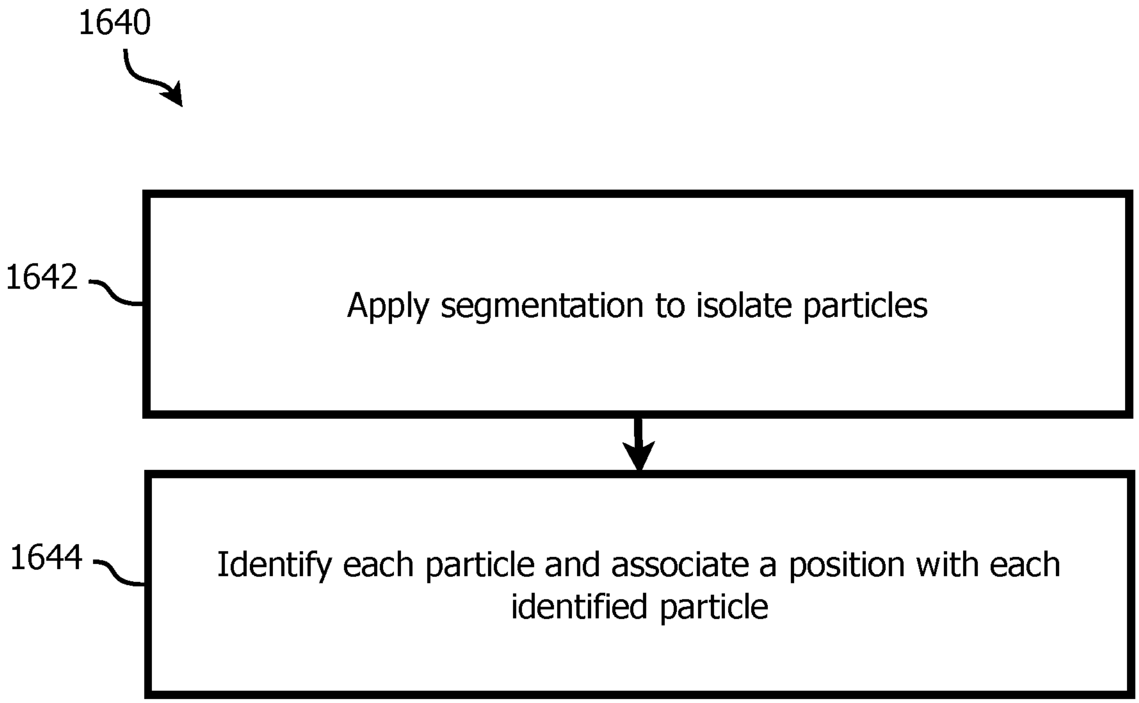
FIG. 22 is a flowchart depicting blocks of code that may be included in the flowchart shown in FIG. 20 in accordance with various embodiments.
Figure 23:
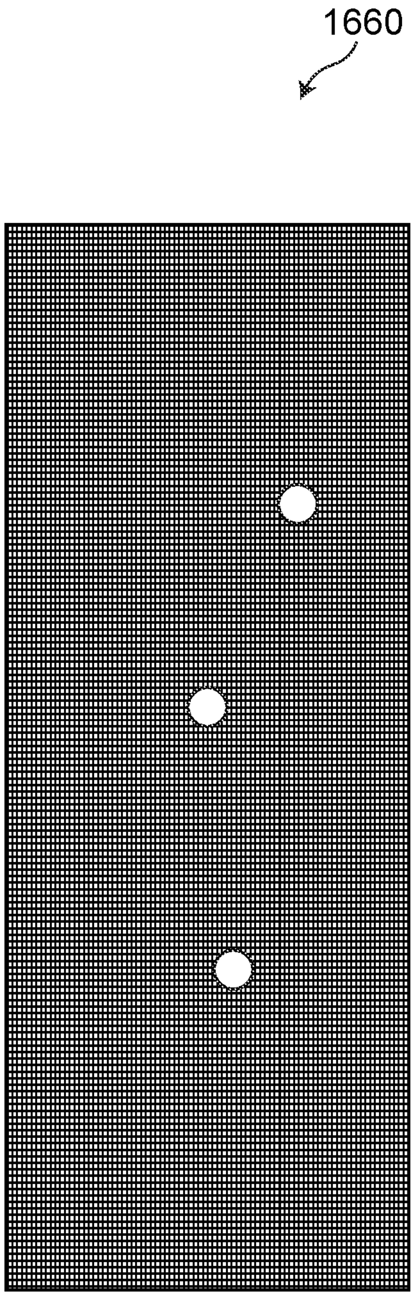
FIG. 23 is a representation of a filtered image that may be used by the controller shown in FIG. 19 in accordance with various embodiments.

Referring to FIG. 22, there is shown a flowchart 1640 depicting blocks of code for directing the controller processor 1501 to generate a representation of a received image that may be included in the block 1582 of the flowchart 1580 shown in FIG. 20 in accordance with various embodiments. The flowchart 1640 begins with block 1642 which directs the controller processor 1501 to apply segmentation to the received pre-dispensed image to isolate particles. In various embodiments, block 1642 may direct the controller processor 1501 to generate a filtered image depicting only particles included in the pre-dispensed image. In some embodiments, the particles depicted may represent cells, for example. Referring to FIG. 23, there is shown at 1660 a representation of a filtered image that may be generated at block 1642 based on the pre-dispensed image 1600 shown in FIG. 21, in accordance with various embodiments.

Block 1644 then directs the controller processor 1501 to identify each particle included in the pre-dispensed image 1600 and to associate a position with each identified particle. In some embodiments, block 1644 may direct the controller processor 1501 to use the filtered image 1660 shown in FIG. 23, which was generated at block 1642, to determine a center of mass for each of the particles and to store the x and y pixel coordinates or positions in the pre-dispensed image 1600 for each center of mass for each particle. In some embodiments, for example, upon execution of block 1644 using the filtered image 1660 shown in FIG. 23, block 1644 may generate a first particle positions record 1680 as shown in FIG. 24.

Referring to FIG. 24, the first particle positions record 1680 includes a first particle x field and a first particle y field for storing x and y pixel coordinates for a determined center of mass of a first particle 1602 shown in the pre-dispensed image 1600 of FIG. 21. The first particle positions record 1680 also includes x and y fields 1687 and 1688 for a second particle 1604 shown in the pre-dispensed image 1600 of FIG. 21 and x and y fields 1690 and 1692 for a third particle 1606 shown in the pre-dispensed image 1600 of FIG. 21. Block 1644 may direct the controller processor 1501 to store the first particle positions record 1680 as a pre-dispensed particle positions record in the location 1542 of the storage memory 1504 shown in FIG. 19. In some embodiments, block 1644 may direct the controller processor 1501 to order the x and y fields such that x and y field pairs representing particles having the highest y field values representing particles that are the most downstream are listed first.

In various embodiments, the first particle positions record 1680 shown in FIG. 24 may be stored as an array, with a position of each value in the array implying the field label for each value. For example, in some embodiments, the first particle positions record 1680 may be stored as an array having values 101, 361, 87, 232, 130, and 133.

In some embodiments, block 1644 may direct the controller processor 1501 to identify shapes of each of the initially identified particles to facilitate identifying each particle and determining a position associated with each particle. In some embodiments, block 1644 may direct the controller processor 1501 to determine whether a potential particle has an irregular or peanut shape (e.g., depicting two overlapping circles), for example. In some embodiments, if a potential particle has a peanut shape, block 1644 may direct the controller processor 1501 to determine that the potential particle is two particles and to include two entries in the generated particle positions record. In some embodiments, block 1644 may direct the controller processor 1501 to best fit an irregular shape with as many circles as possible and to determine that the potential particle is as many particles as can be fit within the irregular shape and to include as many entries as necessary in the generated particle positions record, based on the determined number of circles that best fit the irregular shape.

Figure 25:
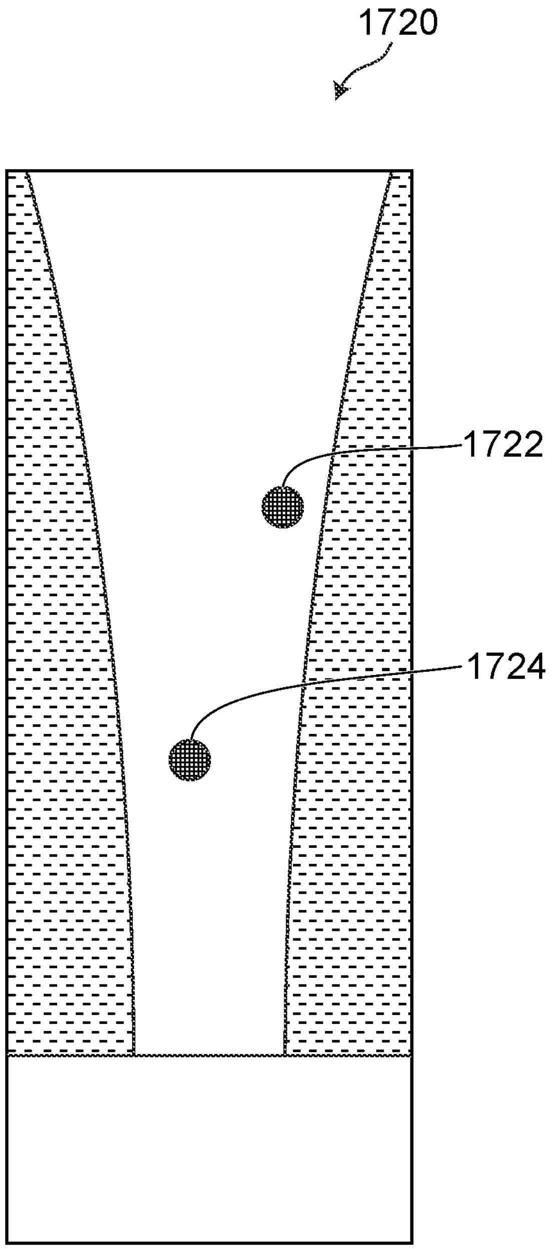
FIG. 25 is a representation of a post-dispensed image that may be used by the controller shown in FIG. 19 in accordance with various embodiments.

Referring back to FIG. 20, block 1584 may direct the controller processor 1501 to receive at least one post-dispensed image of the dispensing portion of the droplet dispenser 16 after the droplet has been dispensed. In various embodiments, block 1584 may direct the controller processor 1501 to produce signals for causing the droplet dispenser 16 to dispense the first droplet generally as described above having regard to block 204 of the flowchart 200 shown in FIG. 4. Block 1584 may direct the controller processor 1501 to receive a post-dispensed image 1720 as shown in FIG. 25 via the interface 1520 of the I/O interface 1512 shown in FIG. 19. In some embodiments, block 1584 may direct the controller processor 1501 to store the post-dispensed image 1720 in the location 1540 of the storage memory 1504 shown in FIG. 19.

In various embodiments, block 1584 may include blocks generally similar to the blocks included in the flowchart 1640 shown in FIG. 22, such that execution of block 1584 directs the controller processor 1501 to generate a second particle positions record 1740 as shown in FIG. 26 and to store the second particle positions record 1740 as a post-dispensed particle positions record in the location 1544 of the storage memory 1504. Referring to FIG. 26, the second particle positions record 1740 includes a first particle x field 1742 and a first particle y field 1744 for storing x and y pixel coordinates for a determined center of mass of a first particle 1722 shown in the post-dispensed image 1720 of FIG. 25. The second particle positions record 1740 also includes a second particle x field 1746 and a second particle y field 1748 for storing x and y pixel coordinates for a determined center of mass of a second particle 1724 shown in the post-dispensed image 1720 of FIG. 25.

Referring back to FIG. 20, block 1586 may direct the controller processor 1501 to compare the at least one pre-dispensed image and the at least one post-dispensed image to determine a particle count representing a count of particles included in the dispensed droplet. In some embodiments, block 1586 may direct the controller processor 1501 to compare the representation of the pre-dispensed image stored in the location 1542 with the representation of the post-dispensed image stored in the location 1544 of the storage memory 1504 to determine the particle count.

For example, in some embodiments, block 1586 may direct the controller processor 1501 to retrieve the first particle positions record 1680 shown in FIG. 24 from the location 1542 of the storage memory 1504 shown in FIG. 19 and to retrieve the second particle positions record 1740 shown in FIG. 26 from the location 1544 of the storage memory 1504 and to compare the records to determine how many, if any, particles appearing in the pre-dispensed image were dispensed in the dispensed droplet.

In some embodiments, block 1586 may direct the controller processor 1501 to determine whether no particles were identified in the first particle positions record 1680. If the controller processor 1501 determines that no particles were identified in the first particle positions record 1680, then block 1586 may direct the controller processor 1501 to determine that no particles were dispensed and so the block may direct the controller processor 1501 to set a droplet particle count stored in the location 1550 of the storage memory 1504 to 0 and to proceed to block 1588 of the flowchart 1580 shown in FIG. 20.

In some embodiments, block 1586 may direct the controller processor 1501 to determine whether no particles were identified in the second particle positions record 1740. If the controller processor 1501 determines that no particles were identified in the second particle positions record 1740, then block 1586 may direct the controller processor 1501 to determine that all of the particles included in the first particle positions record 1680 were dispensed and so block 1586 may direct the controller processor 1501 to set the droplet particle count stored in the location 1550 of the storage memory 1504 to a count of the number of particles included in the first particle positions record 1680 and to proceed to block 1588 of the flowchart 1580 shown in FIG. 20.

In various embodiments, block 1586 directing the controller processor 1501 to first check whether the first and/or the second particle positions records 1680 and/or 1740 include no particles as described above may facilitate fast execution of block 1586.

Figure 27:
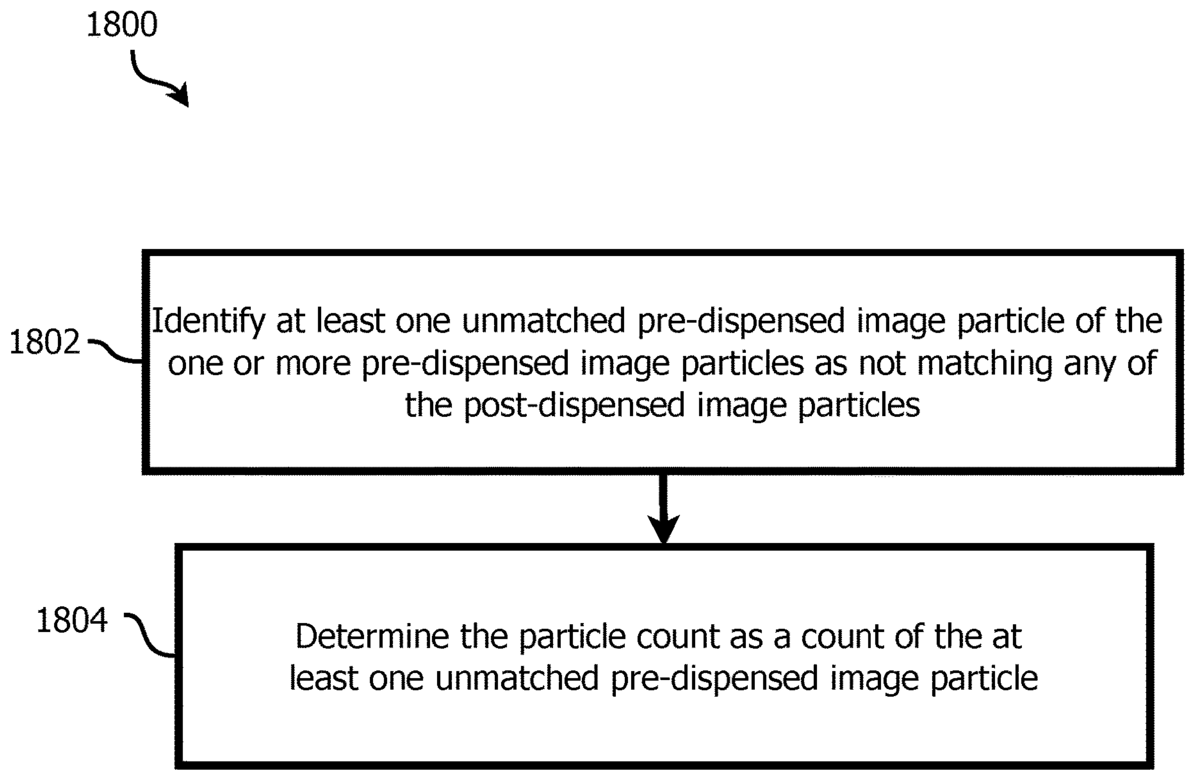
FIG. 27 is a flowchart depicting blocks of code that may be included in the flowchart shown in FIG. 20 in accordance with various embodiments.

In various embodiments, block 1586 may include blocks of code for directing the controller processor 1501 to compare the first and second particle positions records 1680 and 1740 shown in FIGS. 24 and 26 when both the first and second particle positions records 1680 and 1740 include at least one particle. Referring to FIG. 27, there is shown a flowchart 1800 depicting blocks of code that may be included in the block generally similar to the block 206 in accordance with various embodiments.

In various embodiments, the flowchart 1800 begins with block 1802 which directs the controller processor 1501 to identify at least one unmatched pre-dispensed image particle of the pre-dispensed image particles as not matching any of the post-dispensed image particles and therefore representing a particle included in the dispensed droplet. For example, in some embodiments, block 1802 may direct the controller processor 1501 to identify at least one particle represented by the first particle positions record 1680 as not matching any of the particles represented by the second particle positions record 1740 and therefore representing a particle included in a dispensed droplet.

Block 1804 directs the controller processor 1501 to determine the particle count as a count of the at least one unmatched pre-dispensed image particle. In various embodiments, the unmatched particles may be counted via the droplet particle count stored in the location 1550 of the storage memory 1504 and so block 1804 may direct the controller processor 1501 to use the droplet particle count from the location 1550 of the storage memory 1504 to count the number of unmatched particles in the pre-dispensed image. For example, in some embodiments, the number of unmatched particles in the pre-dispensed image may be equal to 1 and so block 1804 may direct the controller processor 1501 to set the dispensed particle count to 1.

Figure 28:
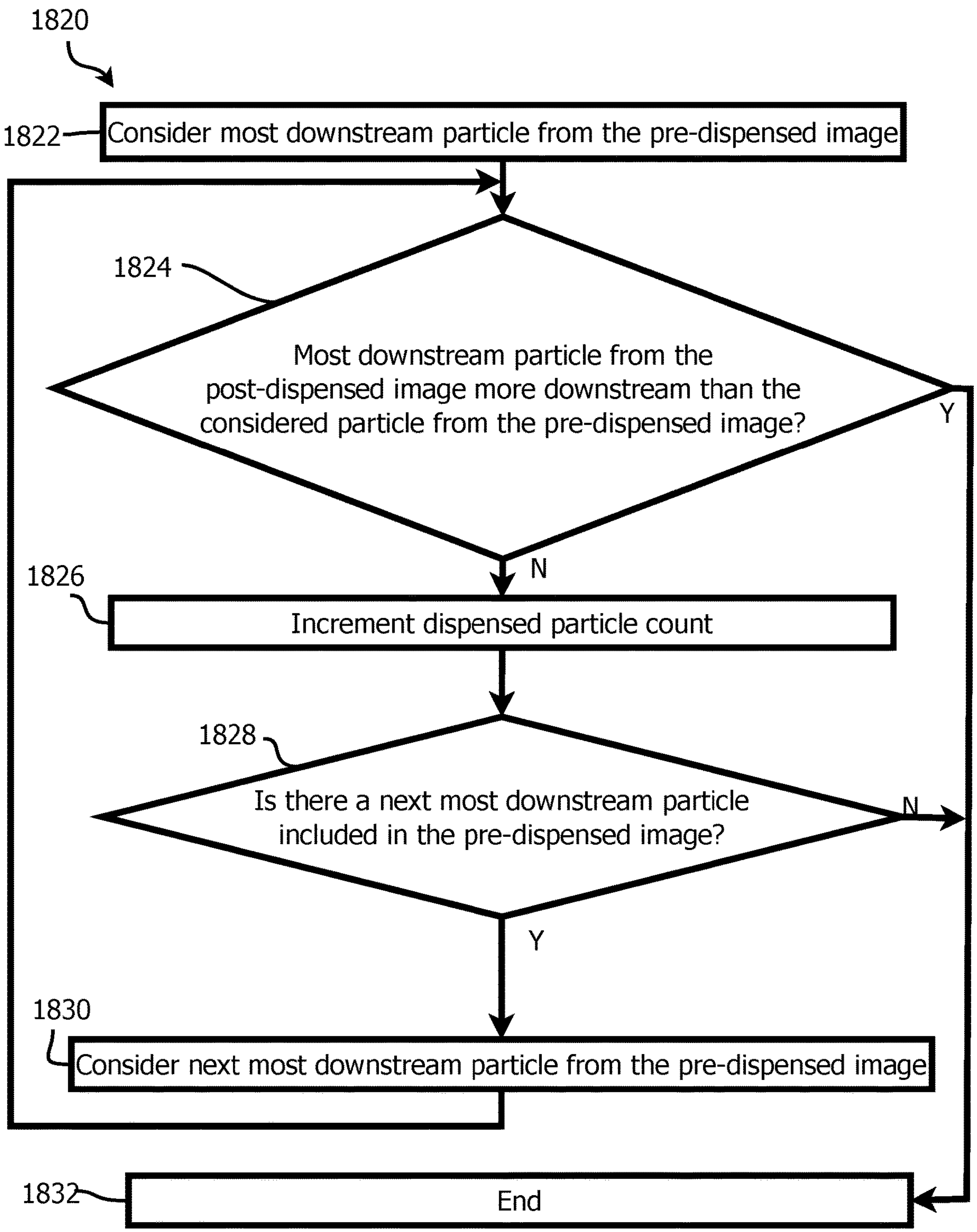
FIG. 28 is a flowchart depicting blocks of code that may be included in the flowchart shown in FIG. 20 in accordance with various embodiments.

Referring to FIG. 28, there is shown a flowchart 1820 depicting blocks of code that may be used to implement the blocks 1802 and 1804 shown in FIG. 27 in accordance with various embodiments. The flowchart 1820 begins with block 1822 which directs the controller processor 1501 to consider the most downstream particle from the pre-dispensed image. In some embodiments, block 1822 may direct the controller processor 1501 to consider the most downstream particle represented by the first particle positions record 1680 stored in the location 1542 of the storage memory 1504 shown in FIG. 19. In some embodiments, the most downstream particle may be the particle associated with the largest y pixel coordinate value and so in various embodiments, block 1822 may direct the controller processor 1501 to consider the particle associated with the x and y fields 1682 and 1684 with values of 101 and 361 respectively, as shown in FIG. 24.

Block 1824 may then direct the controller processor 1501 to determine whether a most downstream particle from the post-dispensed image 1720 is more downstream than the considered particle from the pre-dispensed image 1600. Block 1824 may direct the controller processor 1501 to compare the y field of the most downstream particle from the second particle positions record 1740 with the y field 1684 of the first particle positions record 1680 having a value of 361 to determine whether the y field of the most downstream particle from the second particle positions record 1740 (having a value of 286) is greater than the y field 1684 having a value of 361.

In various embodiments, the controller processor 1501 may determine at block 1824 that the y field of the most downstream particle from the second particle positions record 1740 is not greater than the y field 1684 value and so block 1824 may direct the controller processor 1501 to determine that the most downstream particle from the post-dispensed image 1720 is not more downstream than the considered particle from the pre-dispensed image 1600 and so block 1824 may direct the controller processor 1501 to proceed to block 1826.

In various embodiments, if the most downstream particle from the post-dispensed image is not more downstream than the considered particle, it may be concluded that the considered particle cannot be matched to any particle in the post-dispensed image, since any particle that could be matched to the considered particle should be downstream from it. In some embodiments, the inkjet nozzle having geometries or taper angles that help to ensure that particles are moving forward or downstream towards a nozzle orifice when dispensing takes place (For example, in some embodiments, the taper angles may be less than about 15°) may help to ensure this assumption is true.

Accordingly, block 1826 then directs the controller processor 1501 to increment a droplet particle count to count the unmatched considered particle. For example, in some embodiments, block 1826 may direct the controller processor 1501 to increment the droplet particle count stored in the location 1550 of the storage memory 1504 shown in FIG. 19 from an initial value of 0 to a value of 1.

Referring to FIG. 28, in various embodiments, block 1828 then directs the controller processor 1501 to determine whether there is a next most downstream particle included in the pre-dispensed image 1600. Block 1828 may direct the controller processor 1501 to read the first particle positions record 1680 and determine whether another particle that has a lower y field value than the considered particle is represented in the first particle positions record 1680. If at block 1828 the controller processor 1501 determines that a next most downstream particle is included in the pre-dispensed image 1600, block 1828 directs the controller processor 1501 to proceed to block 1830.

Block 1830 directs the controller processor 1501 to consider the next most downstream particle form the pre-dispensed image. In some embodiments, where the particle associated with fields 1682 and 1684 of the first particle positions record 1680 shown in FIG. 24 was considered at block 1822, block 1830 may direct the controller processor 1501 to consider the particle associated with fields 1687 and 1688 of the first particle positions record 1680.

Referring to FIG. 28, in various embodiments, block 1830 then directs the controller processor 1501 to return to block 1824 and determine whether a most downstream particle from the post-dispensed image 1720 is more downstream than the newly considered particle from the pre-dispensed image. In some embodiments, for example, where the considered particle is associated with the y field 1688, block 1824 may direct the controller processor 1501 to determine that the value of 286 stored in the y field 1744 of the second particle positions record 1740 is greater than the value of 232 stored in the y field 1688 of the first particle positions record 1680. Block 1824 may direct the controller processor 1501 to determine that since the particle associated with the fields 1742 and 1744 is more downstream than the particle associated with the fields 1687 and 1688, there is a high likelihood that these particles are the same particles and so these particles are matched.

In various embodiments, the most downstream particle in the post-dispensed image may be assumed to be present in the pre-dispensed image, if there is one. In some embodiments, if the most downstream particle in the post-dispensed image is able to be matched to a pre-dispensed particle then all the remaining pre-dispensed particles upstream from the matched pre-dispensed particle in the pre-dispensed image may be assumed to have not been dispensed.

In various embodiments, once a considered particle from the first particle position record 1680 is matched and therefore determined not to have been dispensed, it may be assumed that any particles upstream of the matched particle may also be matchable and not dispensed. Accordingly, block 1824 may direct the controller processor 1501 to, upon determining that the most downstream particle from the post-dispensed image is more downstream than the considered particle from the pre-dispensed image, proceed to block 1832 and end the flowchart 1820.

Referring to FIG. 28, in various embodiments, if at block 1828, it is determined that there are no further upstream particles from the considered particle, the controller processor 1501 may also be directed to proceed to block 1832 and the flowchart 1820 may end. After the flowchart 1820 has been executed, there may be stored in the location 1550 of the storage memory 1504 shown in FIG. 19, the droplet particle count representing a count of particles included in the first droplet dispensed into the first target region of the microplate 30. In various embodiments, after the flowchart 1820 has been executed, execution of block 1586 may be complete.

In various embodiments block 1588 of the flowchart 1580 shown in FIG. 20 may then be executed by the controller processor 1501. Block 1588 may direct the controller processor 1501 to produce signals for associating a representation of the droplet particle count with the target region. In various embodiments, block 1588 may be generally similar to block 208 of the flowchart 200 shown in FIG. 4 and may include blocks generally similar to those included in the flowchart 500 shown in FIG. 11, except that no confidences may be used and so blocks 507, and 509 may be omitted. Further, a block generally similar to block 508 may direct the controller processor 1501 to move the second particle positions record 1740 shown in FIG. 26 from the location 1544 to the location 1542 of the storage memory 1504 shown in FIG. 19, such that the second particle positions record 1740 is treated as a pre-dispensed particle positions record.

Accordingly, in various embodiments, after execution of a block generally similar to block 1588 and further executions of the blocks 1584, 1586 and 1588, there may be stored in the location 1554 of the storage memory 1504, a target particle count record including target particle counts for each target, which may have a format generally similar to the target particle record 1060 shown in FIG. 12.

Various Embodiments

In some embodiments, block 208 may include further or alternative code for directing the controller processor 100 to produce signals for associating a representation of the droplet particle count with the target region. For example, in some embodiments block 208 may include code for directing the controller processor 100 to produce signals representing the target count record 1060, for causing the target count record 1060 to be exported to another system and/or used in later testing/processing of the particles dispensed into the microplate 30. In some embodiments, block 1588 of the flowchart 1580 shown in FIG. 20 may include generally similar code for directing the controller processor 1501 to produce signals associating a representation of the droplet particle count with the target region.

In various embodiments, blocks 202 and 204 may direct the controller processor 100 to receive and store alternative or additional representations of pre-dispensed and post-dispensed images. For example, in some embodiments, the complete images may be stored in the locations 140, 142, 144, and 150 and block 206 may direct the controller processor 100 to compare the pre-dispensed images 240, 248, and 254 and the post-dispensed image 320 directly, for example by inputting these images into a neural network. In some embodiments, blocks 1582 and 1584 of the flowchart 1580 shown in FIG. 20 may include code for directing the controller processor 1501 to receive and store alternative or additional representations of pre-dispensed and post-dispensed images, such as the complete image, for example.

Figure 29:
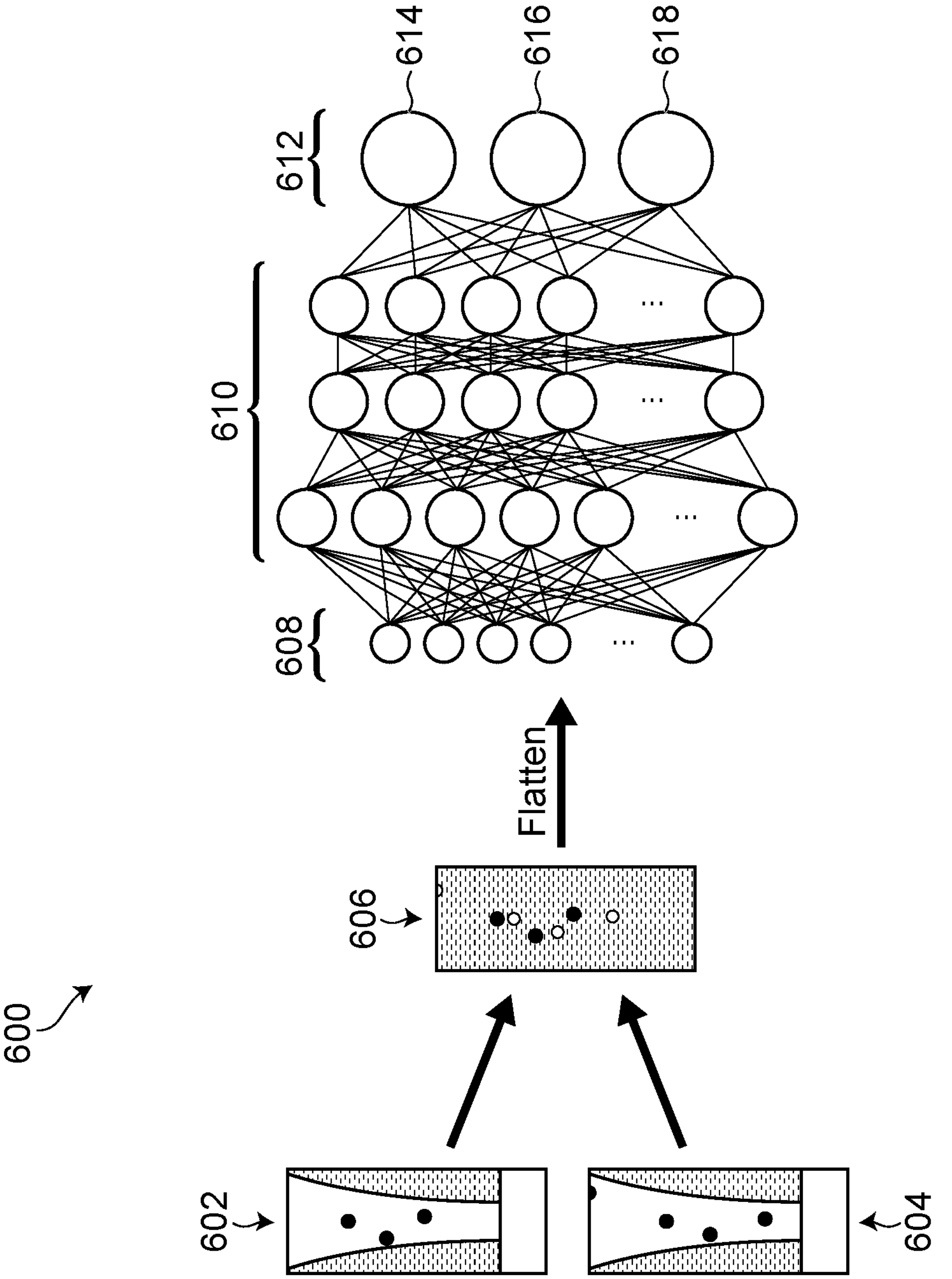
FIG. 29 is a representation of a neural network that may be used in a system generally similar to the system shown in FIG. 1 in accordance with various embodiments.

In some embodiments, block 1586 of the flowchart 1580 shown in FIG. 20 may include code for directing the controller processor 1501 to apply one or more neural networks to the pre-dispensed image 1640 and the post-dispensed image 1720 to determine the particle count representing the count of particles included in a droplet. For example, in some embodiments, block 206 may direct the controller processor 1501 to apply a neural network function 600 as shown in FIG. 29 to a pre-dispensed image 602 and post-dispensed image 604 shown in FIG. 29 to determine a particle count representing the count of particles included in the droplet. In various embodiments, the neural network function 600 may have been previously trained using pre-dispensed and post-dispensed images associated with verified particle counts.

Referring to FIG. 29, the post-dispensed image 604 may be subtracted from the pre-dispensed image 602 and the result may be normalized to generate an image subtraction and normalization image 606, which may be flattened and input into an input layer 608. The output of the input layer 608 may be processed by hidden layers 610 to an output layer 612, with output 614 representing a count confidence associated with no cells dispensed, output 616 representing a count confidence associated with one cell dispensed, and output 618 representing a count confidence associated with multiple cells dispensed.

In some embodiments, use of deep neural networks may outperform traditional algorithms in both accuracy and processing speed by a wide margin. Additionally, in some embodiments, use of a deep learning algorithm may facilitate providing a confidence level for predictions. In some embodiments, this may help decrease the impact of a false positive or negative by providing another metric, as false predictions may have low confidence levels while correct classifications may have very high confidence levels. In various embodiments, this may be difficult or impossible in traditional algorithms as logic systems tend to produce more or less binary results.

In some embodiments, any or all of the at least one pre-dispensed images and/or any or all of the at least one post-dispensed images described herein may each include a plurality of images represented by a video, for example. In such embodiments, the plurality of images may be treated generally as described above regarding the single pre-dispensed images and post-dispensed images.

In some embodiments, block 502 of the flowchart 500 shown in FIG. 11 may include a break condition such that block 502 may direct the controller processor 100 to proceed to block 504 and move on to a next target region if a threshold maximum number of additional droplets have been dispensed to a single target region. In some embodiments, block 502 may direct the controller processor 100 to store in location 174 of storage memory 104 a count of the number of times that block 502 has directed the controller processor 100 to proceed to block 508 for a particular target region and block 502 may direct the controller processor 100 to determine whether the count stored in the location 174 of the storage memory 104 is greater than the threshold maximum number of additional droplets. If the count is greater than the threshold maximum number of additional droplets, block 502 may direct the controller processor 100 to proceed to block 504 regardless of whether the dispensed particle count is less than the desired particle count. In some embodiments, the threshold number of additional droplets may be about 9, for example, such that a maximum of 10 droplets may be dispensed for each target region. In various embodiments, this may help the system 10 work with some applications such as genome sequencing where the reagent composition must be closely controlled. For example, in some embodiments, this may help the system 10 work with applications where downstream applications may be volumetrically sensitive (e.g. downstream chemical reactions), because, for example, if too many droplets are dispensed this would dilute reagents that may already be in the target regions or nanowells. For example, if the cells are dispensed directly into a lysis buffer that has previously been aliquoted into the nanowells, dispensing too many empty droplets will dilute the lysis buffer. In various embodiments, the above feature may be implemented in the controller 1500 with the additional droplet count stored in the location 1556 of the storage memory 1504 shown in FIG. 19.

Figure 30:
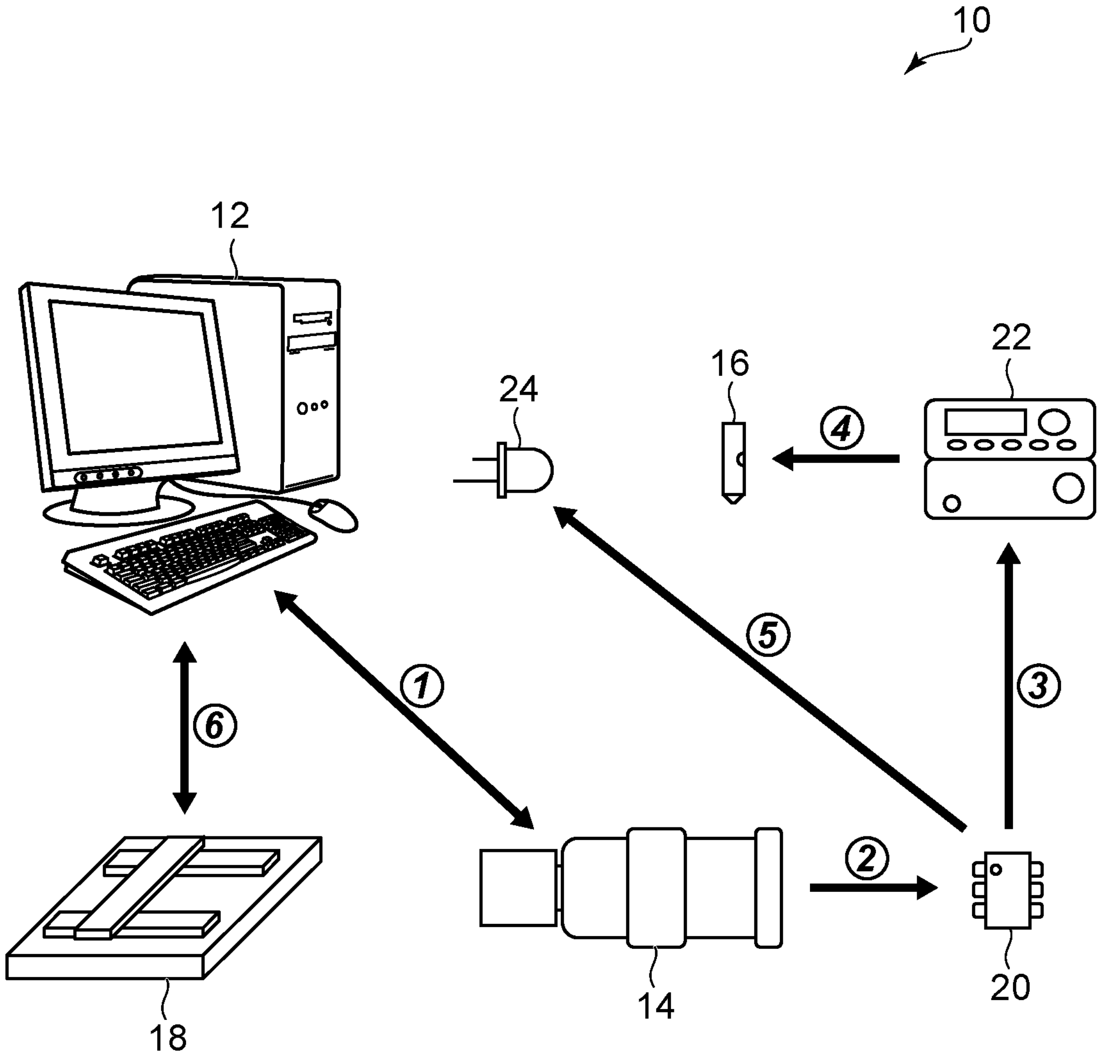
FIG. 30 is a schematic view of an implementation of the system shown in FIG. 1 in accordance with various embodiments.

Referring now to FIG. 30, there is shown a schematic representation of elements of the system 10 shown in FIG. 1, in accordance with various embodiments. Referring to FIG. 30, the system 10 includes the controller 12, which may include a computer running main controlling software, for example, in communication with the imager 14, which may include a camera, for example, and the substrate stage 18, which may include an X-Y positioning stage, for example. The system 10 also includes a microcontroller 20 in communication with the imager 14 and a function generator and amplifier 22 and a light emitting diode (LED) 24 both in communication with the microcontroller. In various embodiments, the function generator and amplifier 22 may be in communication with the dispenser 16, which may include an inkjet nozzle, for example.

In some embodiments, block 204 of the flowchart 200 shown in FIG. 4 may direct the controller processor 100 to send a signal via USB to the imager 14 for causing the imager 14 to cause a droplet to be dispensed by the droplet dispenser 16 and for triggering the capture of a post-dispensed image with an exposure time of about 3-5 ms for example. Accordingly, in some embodiments, the controller processor 100 may cause the capture of a post-dispensed image to begin prior to dispensing the droplet and so, in some embodiments, the post-dispensed image may be captured during and after the droplet has been ejected. In various embodiments, scientific cameras may typically require exposures on the order of milliseconds while inkjet nozzles may operate at frequencies of 100-1000 Hz and common microcontrollers may operate in the MHz ranges. Therefore, in some embodiments, triggering the camera capture first may save on latency with the propagation of signals between the devices as it may be the rate limiting step and noticeable effects may be small. Accordingly, in some embodiments, capturing the post-dispensed image both during and after the droplet has been ejected may be a fast way to synchronize all necessary components to acquire an image of the nozzle after dispensing.

In some embodiments, upon receiving the signal from the controller 12, the imager 14 may send a transistor-transistor logic ("TTL") signal via a wire to the microcontroller 20 and the microcontroller 20 may receive the signal as a hardware interrupt. The microcontroller 20 may then send a TTL signal via a wire to the function generator and amplifier 22 which may respond by outputting an actuation signal to the droplet dispenser 16 to cause a droplet to be dispensed. The droplet dispenser 16 may receive the actuation signal and dispense a droplet. The microcontroller 20 may wait for a user defined delay (e.g., between about 100 and about 1000 μs) and then produce signals for causing the LED 24 to turn on. In various embodiments, this delay may be long enough to allow the droplet dispenser 16 to dispense the droplet before turning the LED 24 on. In various embodiments, the LED 24 may remain on until the post-dispensed image exposure time of 3-5 ms has elapsed. Once the post-dispensed image has been captured, the imager 14 may transmit a representation of the post-dispensed image to the controller 12 and block 204 may be executed as described herein.

In various embodiments, if at block 208, a "move" command is necessary, then block 208 may direct the controller processor 100 to send a serial command to the substrate stage 18 via USB, for example, to tell the substrate stage how much to move by on each axis. Once the move is completed the substrate stage 18 may send a serial command back to the controller 12 signaling completion of the move command and the controller 12 may proceed with further processing. In various embodiments, the controller 1500 may be included in the system 10 in place of the controller 12 shown in FIG. 30.

In some embodiments, a system generally similar to the system 10 shown in FIG. 1 may include a controller configured to communicate directly with the droplet dispenser 16 and configured to control the droplet dispenser 16.

In some embodiments, block 208 of the flowchart 200 shown in FIG. 4 may direct the controller processor 100 to determine whether a dispensed particle count matches a desired particle count and, if the particle count matches the desired particle count, to produce signals identifying the target region as containing the desired particle count. For example, in some embodiments, block 208 may direct the controller processor 100 to include in the target count record 1060, in addition to or alternatively to the particle count fields, a target status field associated with each target region. In some embodiments, the target status field may include a status indicator, which in some embodiments may be set to TRUE if the dispensed particle count for the associated target region matches the desired particle count and set to FALSE if the dispensed particle count for the associated target region does not match the desired particle count. In various embodiments, the status indicator may act as a representation of the dispensed particle count. Accordingly, in various embodiments, block 208 may direct the controller processor 100 to determine whether a dispensed particle count matches the desired particle count and to set the target status field accordingly. In various embodiments, block 1588 of the flowchart 1580 shown in FIG. 20 may include similar code.

In some embodiments, there may be a range of desired particle counts and block 208 or block 1588 may direct the controller processor 100 or 1501 to determine whether the dispensed particle count matches a desired particle count range.

In some embodiments, the dispensed particle count may be a non-integer, such as, for example, where a neural network is used to determine the dispensed particle count.

In various embodiments, the target status field may include additional or alternative information such as, for example, the number of droplets dispensed into the target before dispensing the particle, information about cell morphology or other features such as from fluorescence image acquisition, phenotypic scores based on multidimensional classification and/or other information.

In some embodiments block 208 or block 1588 may direct the controller processor 100 or 1501 to simply record the droplet particle count as the dispensed particle count and/or record a status indicator in association with each target region, without checking whether further droplets should be dispensed to the target. In some embodiments, a new target may be targeted after each droplet is dispensed.

In some embodiments, all of the images or a subset of the images (e.g., post-dispensed and pre-dispensed images) received may be kept for record keeping purposes.

In various embodiments, the neural network defined by data stored in the location 158 of the storage memory 104 shown in FIG. 3 (such as one generally similar to the CNN 1000 shown in FIG. 10) may be configured to output count confidences associated with additional or alternative counts, such as, for example, 2 particles, 3 particles, 4 particles, or any other number of particles and those count confidences may be treated generally as described herein.

In some embodiments, the neural network definition data stored in the location 158 of the storage memory 104 shown in FIG. 3 may be stored on a device separate from the controller 12 and in communication with the controller 12. In some embodiments, the processing required to generate the outputs for the CNN 1000 shown in FIG. 10 may be performed by one or more separate devices from the controller 12 and the results may be transmitted to the controller 12.

In some embodiments, devices or systems described as separate herein may be implemented as a single device. For example, in some embodiments, the trainer 1244 and the controller of the system 1242 shown in FIG. 16 may be implemented as a single device.

In various embodiments, block 206 of the flowchart 200 shown in FIG. 4 may direct the controller processor 100 shown in FIG. 3 to store all of the determined count confidences, and not just the largest count confidence, in the location 161 of the storage memory 104. In some embodiments, the target count confidence record 1100 shown in FIG. 13 may store all of the count confidences and the associated counts for all droplets dispensed to a particular target.

Figure 31:
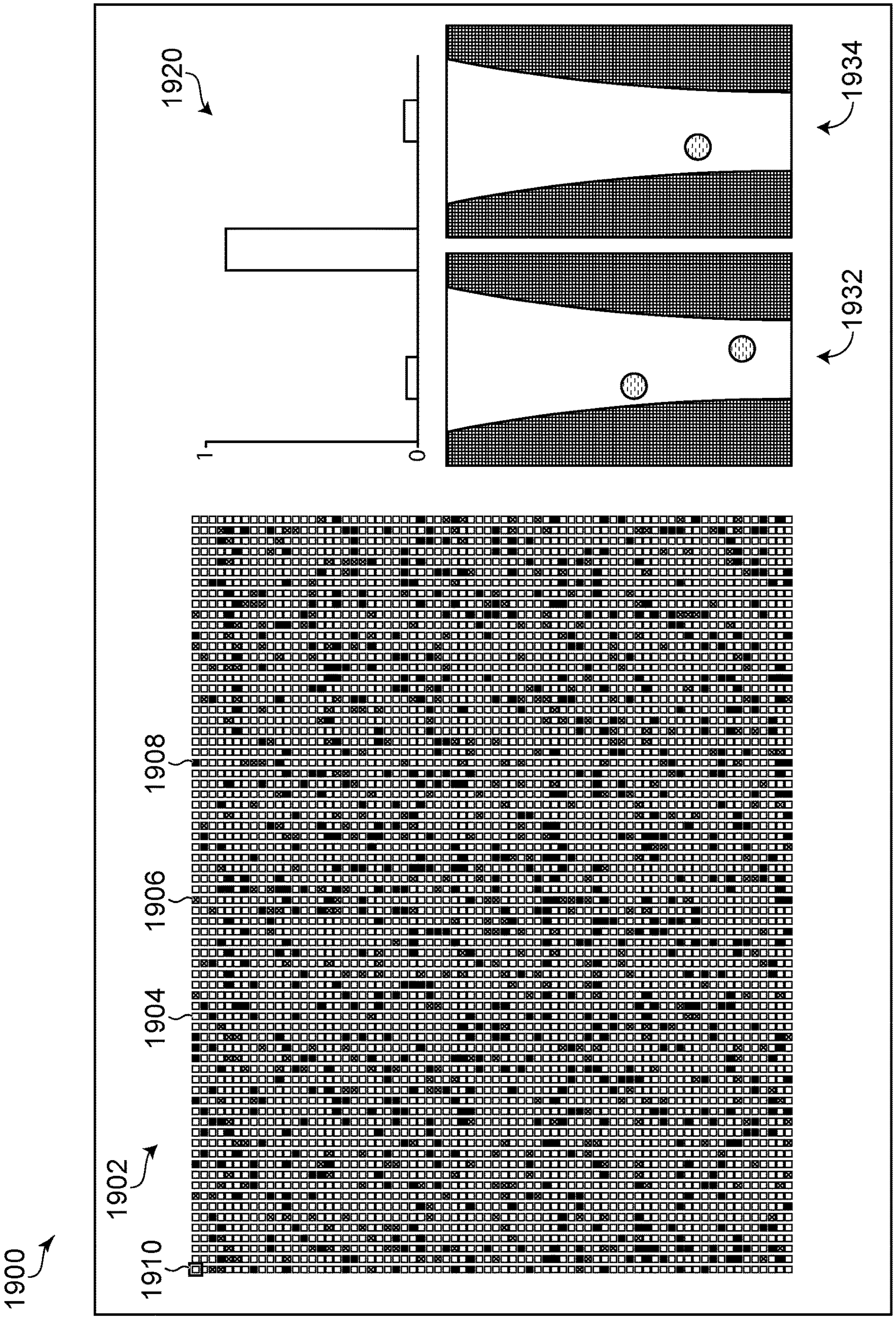
FIG. 31 is a representation of an exemplary graphical user interface ("GUI") that may be displayed by a display included in the system shown in FIG. 1 in accordance with various embodiments.

As disclosed herein, in some embodiments, the system 10 shown in FIG. 1 may include a display in communication with the controller 12 and the block of codes 190 of the program memory 102 may include code for directing the controller processor 100 shown in FIG. 3 to communicate with the display to cause a representation of the target count record 1060 shown in FIG. 12, the target count confidence record 1100 shown in FIG. 13, and/or the target count validity record 1180 shown in FIG. 15 to be displayed by the display to a user. Referring to FIG. 31, there is shown an exemplary graphical user interface ("GUI") 1900 which may be displayed to a user using the system 10. The GUI 1900 may include a representation 1902 of the microplate 30 shown in FIG. 2, wherein the representation 1902 depicts information from the target count record 1060 shown in FIG. 12, showing particle counts for each target region of the microplate 30. In some embodiments, the representation 1902 may include, for each target region, a visual indicator representing the particle count for that target region, as set out in the target count record 1060.

In some embodiments, a target region associated with a particle count of 1 may be shown as green (represented by a white box, such as white box 1904, shown in FIG. 31), a target region associated with a particle count of 2 or more may be shown as red (represented by a box including an X, such as box 1906, shown in FIG. 31), and a target region associated with a count of 0 may be shown as a black box, such as box 1908 shown in FIG. 31.

In some embodiments, a user may select any of the boxes included in the representation 1902 to view additional information for the target region associated with the selected box. In some embodiments, for example, box 1910 may be selected as shown in FIG. 31 and codes included in the block of codes 190 shown in FIG. 3 may direct the controller processor 100 to cause a representation 1920 of one or more count confidences for the selected block 1910 to be displayed in the display 1900. In some embodiments, the box 1910 may be selected as shown in FIG. 31 and codes included in the block of codes 190 shown in FIG. 3 may direct the controller processor 100 to cause a representation 1930 of a first pre-dispensed image 1932 and a post-dispensed image 1934 used as inputs for the selected box 1910. In some embodiments, the count confidences, first pre-dispensed image 1932 and post dispensed image 1934 displayed may be those associated with a droplet for which a desired particle count of 1 was determined.

While specific embodiments of the invention have been described and illustrated, such embodiments should be considered illustrative of the invention only and not as limiting the invention as construed in accordance with the accompanying claims.

The invention claimed is:

1. A system for controlled particle deposition from a droplet dispenser, the system comprising a controller in communication with an imager and a substrate stage, wherein the controller is configured to:

receive at least one pre-dispensed image of a nozzle of the droplet dispenser from the imager, the nozzle including fluid to be dispensed in a subject droplet to a subject target region of the substrate stage;

cause the droplet dispenser to dispense the subject droplet to the subject target region;

receive at least one post-dispensed image of the nozzle of the droplet dispenser from the imager after the subject droplet has been dispensed;

compare the at least one pre-dispensed image and the at least one post-dispensed image to determine a subject droplet particle count representing a count of particles included in the subject droplet;

determine whether the subject droplet particle count is less than a desired particle count; and cause the droplet dispenser to dispense a further droplet to the subject target region of the substrate stage if the subject droplet particle count is less than the desired particle count, and cause the droplet dispenser to dispense a subsequent droplet to a subsequent target region of the substrate stage different from the subject target region of the substrate stage if the subject droplet particle count is not less than the desired particle count.

2. The system of claim 1, wherein comparing the at least one pre-dispensed image and the at least one post-dispensed image comprises processing data representing the at least one pre-dispensed image and the at least one post-dispensed image using one or more functions.

3. The system of claim 2, wherein the controller is further configured to generate a plurality of count confidences, each representing a confidence that the subject droplet includes a particular number of particles.

4. The system of claim 3, wherein comparing the at least one pre-dispensed image and the at least one post-dispensed image to determine the subject droplet particle count comprises determining the subject droplet particle count to be the number of particles associated with a largest of the plurality of count confidences.

5. The system of claim 3, wherein the controller is further configured to compare a largest of the plurality of count confidences to a threshold confidence to determine whether the largest of the plurality of count confidences is less than the threshold confidence.

6. The system of claim 2 wherein comparing the at least one pre-dispensed image and the at least one post-dispensed image comprises:

generating a first image difference representing a difference between a first pre-dispensed image of the at least one pre-dispensed image and the at least one post-dispensed image; and processing data representing the first image difference using the one or more functions.

7. The system of claim 6, wherein:

the first pre-dispensed image of the at least one pre-dispensed image represents the droplet dispenser at a first pre-dispensed time;

the at least one pre-dispensed image includes a second pre-dispensed image representing the droplet dispenser at a second pre-dispensed time prior to the first pre-dispensed time; and comparing the at least one pre-dispensed image and the at least one post-dispensed image comprises:

generating a second image difference representing a difference between the second pre-dispensed image and the first pre-dispensed image; and processing data representing the second image difference using the one or more functions.

8. The system of claim 7, wherein the controller is further configured to cause a first preceding droplet to be dispensed by the droplet dispenser between the second pre-dispensed time and the first pre-dispensed time.

9. The system of claim 7, wherein:

the at least one pre-dispensed image includes a third pre-dispensed image representing the droplet dispenser at a third pre-dispensed time prior to the second pre-dispensed time; and comparing the at least one pre-dispensed image and the at least one post-dispensed image comprises:

generating a third image difference representing a difference between the third pre-dispensed image and the second pre-dispensed image; and processing data representing the third image difference using the one or more functions.

10. The system of claim 9, wherein the controller is further configured to cause a second preceding droplet to be dispensed by the droplet dispenser between the third pre-dispensed time and the second pre-dispensed time.

11. The system of claim 2, wherein the one or more functions include one or more neural network functions.

12. The system of claim 1, wherein the controller is further configured to determine whether the subject droplet particle count matches a desired particle count and, if the subject droplet particle count matches the desired particle count, identify the subject target region as containing the desired particle count.

13. The system of claim 1, wherein the controller is further configured to:

identify one or more pre-dispensed image particles depicted in the at least one pre-dispensed image of the nozzle; and identify one or more post-dispensed image particles depicted in the at least one post-dispensed image of the nozzle;

wherein comparing the at least one pre-dispensed image of the nozzle and the at least one post-dispensed image of the nozzle comprises:

identifying at least one unmatched pre-dispensed image particle of the one or more pre-dispensed image particles as not matching any of the post-dispensed image particles and therefore representing a particle included in the subject droplet; and determining the subject droplet particle count as a count of the at least one unmatched pre-dispensed image particle.

* * * * *